United States Patent
Higuchi

(10) Patent No.: US 11,431,656 B2
(45) Date of Patent: Aug. 30, 2022

(54) SWITCH IDENTIFICATION METHOD AND NON-TRANSITORY COMPUTER-READABLE RECORDING MEDIUM

(71) Applicant: FUJITSU LIMITED, Kawasaki (JP)

(72) Inventor: Junichi Higuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/180,985

(22) Filed: Feb. 22, 2021

(65) Prior Publication Data

US 2021/0367907 A1   Nov. 25, 2021

(30) Foreign Application Priority Data

May 19, 2020   (JP) .............................. JP2020-087239

(51) Int. Cl.
*H04L 12/931* (2013.01)
*H04L 49/00* (2022.01)
*H04L 49/25* (2022.01)

(52) U.S. Cl.
CPC .............. *H04L 49/70* (2013.01); *H04L 49/25* (2013.01)

(58) Field of Classification Search
CPC ..... H04L 49/70; H04L 41/0806; H04L 43/06; H04L 25/4923; H04L 45/38; H04L 63/20; H04L 41/145; H04L 12/4675; H04L 12/4666; H04L 41/0816; H04L 43/50; H04L 41/5038; H04L 5/0032; H04L 43/0811; H04L 12/185; H04L 43/026; H04L 63/1491; H04L 67/1008; H04L 47/39; H04L 12/4641; H04L 12/4633; H04L 41/12; H04L 12/4608; H04L 45/02; H04L 45/00; H04L 45/74; H04L 43/10; H04L 45/586; H04L 45/745; H04L 49/25; G06F 11/263; G06F 9/45558;
(Continued)

(56) References Cited

U.S. PATENT DOCUMENTS 9,071,548 B2 * 6/2015 Lucau ..................... H04L 49/70
9,148,342 B2 * 9/2015 Numata ............. H04L 12/4641
(Continued)

FOREIGN PATENT DOCUMENTS

CN   112187584 A   *   1/2021
CN   112311614 A   *   2/2021
(Continued)

OTHER PUBLICATIONS

Extended European Search Report dated Aug. 5, 2021 for corresponding European Patent Application No. 21156537.9, 8 pages.

*Primary Examiner* — Wutchung Chu
(74) *Attorney, Agent, or Firm* — Fujitsu Patent Center

(57) ABSTRACT

A switch identification method in by a computer includes sending a first packet to a first virtual switch emulating a first physical switch, and identifying a second virtual switch that is an allocation destination to which the first virtual switch allocates the first packet, and referring, to a storage unit that stores a switch correspondence information that associates a second physical switch that is an allocation destination of the first physical switch with the second virtual switch, and identifying the second physical switch that is the allocation destination to which the first physical switch allocates a second packet emulated by the first packet.

7 Claims, 27 Drawing Sheets

(58) Field of Classification Search
CPC .... G06F 9/455; G06F 9/45533; G06F 9/5077; G06F 13/105; G06F 21/566; G06N 20/00
See application file for complete search history.

(56) References Cited

U.S. PATENT DOCUMENTS

| | | | | |
|---|---|---|---|---|
| 9,432,254 | B1* | 8/2016 | Naqvi | H04L 41/0897 |
| 9,697,172 | B1* | 7/2017 | Somohano | H04L 41/12 |
| 10,044,830 | B2* | 8/2018 | Otake | H04L 67/60 |
| 10,264,020 | B1* | 4/2019 | Nanda | H04L 63/20 |
| 10,484,259 | B2* | 11/2019 | Gao | H04L 12/4641 |
| 10,944,641 | B1* | 3/2021 | Zacks | H04L 43/045 |
| 11,206,205 | B1* | 12/2021 | Gupta | H04L 41/0893 |
| 2008/0235690 | A1* | 9/2008 | Ang | G06F 9/546 718/102 |
| 2008/0304421 | A1* | 12/2008 | Ramasubramanian | H04L 43/0852 370/251 |
| 2009/0296588 | A1 | 12/2009 | Nishi et al. | |
| 2010/0074238 | A1* | 3/2010 | Qian | G06F 9/455 370/395.53 |
| 2010/0082316 | A1* | 4/2010 | Chawla | H04L 12/4641 703/13 |
| 2010/0290473 | A1 | 11/2010 | Enduri et al. | |
| 2012/0245917 | A1* | 9/2012 | Chawla | H04L 12/4641 703/22 |
| 2014/0313928 | A1* | 10/2014 | Fernando | H04L 45/02 370/254 |
| 2015/0043581 | A1 | 2/2015 | Devireddy et al. | |
| 2015/0071110 | A1* | 3/2015 | Kothari | H04L 41/0846 370/254 |
| 2015/0074661 | A1* | 3/2015 | Kothari | H04L 41/12 718/1 |
| 2016/0036732 | A1* | 2/2016 | Lu | H04L 69/161 370/235 |
| 2016/0080415 | A1* | 3/2016 | Wu | H04L 63/1491 726/23 |
| 2016/0110211 | A1* | 4/2016 | Karnes | H04L 43/20 718/1 |
| 2016/0134563 | A1* | 5/2016 | Yu | H04L 12/4641 370/392 |
| 2016/0191545 | A1* | 6/2016 | Nanda | H04L 63/0227 726/1 |
| 2018/0048551 | A1* | 2/2018 | Lee | H04L 47/787 |
| 2018/0109602 | A1* | 4/2018 | Doctor | H04L 43/20 |
| 2018/0337830 | A1* | 11/2018 | Padhye | H04L 41/0863 |
| 2019/0028345 | A1 | 1/2019 | Kommula et al. | |
| 2019/0028409 | A1* | 1/2019 | Jiang | H04L 49/70 |
| 2019/0109714 | A1* | 4/2019 | Clark | H04L 63/06 |
| 2019/0190851 | A1* | 6/2019 | Hsu | H04L 45/64 |
| 2019/0349294 | A1* | 11/2019 | Cardona | G06F 9/5077 |
| 2020/0053024 | A1* | 2/2020 | Suzuki | G06F 9/45533 |
| 2020/0158810 | A1* | 5/2020 | Zhang | G01S 5/0215 |
| 2020/0267082 | A1* | 8/2020 | Dong | H04L 45/02 |
| 2020/0382399 | A1* | 12/2020 | Tewari | H04L 43/20 |
| 2021/0075689 | A1* | 3/2021 | Ramanathan | H04L 41/147 |
| 2021/0226848 | A1* | 7/2021 | Kommula | H04L 41/12 |
| 2021/0234898 | A1* | 7/2021 | Desai | H04L 61/2557 |

FOREIGN PATENT DOCUMENTS

| | | | | |
|---|---|---|---|---|
| CN | 113411200 A | * | 9/2021 | |
| EP | 2940952 A1 | | 4/2015 | |
| EP | 3211858 A1 | | 12/2015 | |
| EP | 3913874 A1 | * | 11/2021 | ............ H04L 49/25 |
| JP | 2017-038239 A | | 2/2017 | |
| WO | 2008126179 A1 | | 10/2008 | |
| WO | WO-2013184846 A1 | * | 12/2013 | ............ G06F 11/008 |
| WO | WO-2019017842 A1 | * | 1/2019 | |

\* cited by examiner

FIG. 11

<Syslog INFORMATION $H_{log}$>

| TIME | NETWORK DEVICE NAME | NW I/F NAME | STATUS OF NW I/F |
|---|---|---|---|
| 2018/12/26 9:03:24 | Leaf 1 | Eth1/1 | Up |
| 2018/12/26 9:03:27 | Leaf 2 | Eth1/2 | Up |
| 2018/12/26 9:03:32 | Leaf 1 | Eth1/2 | down |
| 2018/12/26 9:03:33 | Leaf 1 | Eth1/2 | Up |

FIG. 12

<NETWORK TOPOLOGY INFORMATION $H_{top}$>

| NETWORK DEVICE NAME | NW I/F NAME | CONNECTION DESTINATION NETWORK DEVICE NAME | CONNECTION DESTINATION NW I/F NAME |
|---|---|---|---|
| Leaf 1 | Eth1/1 | Spine 1 | Eth1/1 |
| Leaf 1 | Eth1/2 | Spine 2 | Eth1/1 |
| Leaf 2 | Eth1/1 | Spine 1 | Eth1/2 |
| Leaf 2 | Eth1/2 | Spine 2 | Eth1/2 |
| Leaf 3 | Eth1/1 | Spine 1 | Eth1/3 |
| Leaf 3 | Eth1/2 | Spine 2 | Eth1/3 |

FIG. 14

<NETWORK INTERFACE INFORMATION $G_{if}$>

| NETWORK DEVICE NAME | NW I/F NAME | IP ADDRESS |
|---|---|---|
| Leaf 1 | Eth1/1 | 192.0.2.111 |
| Leaf 1 | Eth1/2 | 192.0.2.112 |
| Leaf 2 | Eth1/1 | 192.0.2.121 |
| Leaf 2 | Eth1/2 | 192.0.2.122 |
| Leaf 3 | Eth1/1 | 192.0.2.131 |
| Leaf 3 | Eth1/2 | 192.0.2.132 |
| Spine 1 | Eth1/1 | 192.0.2.10 |
| Spine 1 | Eth1/2 | 192.0.2.11 |
| Spine 1 | Eth1/3 | 192.0.2.12 |
| Spine 2 | Eth1/1 | 192.0.2.100 |
| Spine 2 | Eth1/2 | 192.0.2.101 |
| Spine 2 | Eth1/3 | 192.0.2.102 |
| Leaf 1 | lo0 | 172.16.1.1 |
| Leaf 2 | lo0 | 172.16.2.1 |
| Leaf 3 | lo0 | 172.16.3.1 |

FIG. 15

< ROUTING TABLE INFORMATION $G_{route}$ >

| NETWORK DEVICE NAME | DESTINATION NETWORK | NEXT HOP | AD VALUE | METRICS |
|---|---|---|---|---|
| Leaf 1 | 172.16.2.1/32 | 192.0.2.10 | 170 | 0 |
| Leaf 1 | 172.16.2.1/32 | 192.0.2.100 | 170 | 0 |
| Leaf 1 | 172.16.3.1/32 | 192.0.2.10 | 170 | 0 |
| Leaf 1 | 172.16.3.1/32 | 192.0.2.100 | 170 | 0 |
| Leaf 2 | 172.16.1.1/32 | 192.0.2.11 | 170 | 0 |
| Leaf 2 | 172.16.1.1/32 | 192.0.2.101 | 170 | 0 |
| Leaf 2 | 172.16.1.1/32 | 192.0.2.11 | 170 | 0 |
| Leaf 2 | 172.16.1.1/32 | 192.0.2.101 | 170 | 0 |
| Leaf 3 | 172.16.2.1/32 | 192.0.2.12 | 170 | 0 |
| Leaf 3 | 172.16.2.1/32 | 192.0.2.102 | 170 | 0 |
| Leaf 3 | 172.16.3.1/32 | 192.0.2.12 | 170 | 0 |
| Leaf 3 | 172.16.3.1/32 | 192.0.2.102 | 170 | 0 |
| Spine 1 | 172.16.1.1/32 | 192.0.2.111 | 170 | 0 |
| Spine 1 | 172.16.2.1/32 | 192.0.2.121 | 170 | 0 |
| Spine 1 | 172.16.3.1/32 | 192.0.2.131 | 170 | 0 |
| Spine 2 | 172.16.1.1/32 | 192.0.2.112 | 170 | 0 |
| Spine 2 | 172.16.2.1/32 | 192.0.2.122 | 170 | 0 |
| Spine 2 | 172.16.3.1/32 | 192.0.2.132 | 170 | 0 |

FIG. 16

<MAC TABLE INFORMATION $G_{mac}$>

| NETWORK DEVICE NAME | DESTINATION MAC ADDRESS | NEXT HOP |
|---|---|---|
| Leaf 1 | 00:00:5e:00:53:01 | Eth4 |
| Leaf 1 | 00:00:5e:00:53:02 | 172.16.2.1 |
| Leaf 1 | 00:00:5e:00:53:03 | 172.16.3.1 |
| Leaf 2 | 00:00:5e:00:53:01 | 172.16.1.1 |
| Leaf 2 | 00:00:5e:00:53:02 | Eth4 |
| Leaf 2 | 00:00:5e:00:53:03 | 172.16.3.1 |
| Leaf 3 | 00:00:5e:00:53:01 | 172.16.1.1 |
| Leaf 3 | 00:00:5e:00:53:02 | 172.16.2.1 |
| Leaf 3 | 00:00:5e:00:53:03 | Eth4 |

FIG. 17

<FIRST SESSION CORRESPONDENCE INFORMATION $F_1$>

| SESSION IN ACTUAL ENVIRONMENT | PHYSICAL SPINE SWITCH 8 AS ALLO-CATION DESTINATION |
|---|---|
| 9a — 192.168.1.10:60000->192.168.1.2:80/tcp | Spine 1 |
| 9a — 192.168.1.10:60002->192.168.1.2:80/tcp | Spine 2 |

FIG. 18

<SECOND SESSION CORRESPONDENCE INFORMATION $F_2$>

| SESSION IN EMULATION ENVIRONMENT | VIRTUAL SPINE SWITCH 28 AS ALLOCATION DESTINATION |
|---|---|
| 29a -- 192.168.1.10:60000->192.168.1.2:80/tcp | Spine 2 |
| 29a -- 192.168.1.10:60002->192.168.1.2:80/tcp | Spine 1 |

FIG. 23

<SESSION INFORMATION>

| SESSION NUMBER | SENDER IP ADDRESS | SENDER PORT NUMBER | DESTINATION IP ADDRESS | DESTINATION PORT NUMBER | PROTOCOL |
|---|---|---|---|---|---|
| 1 | 192.168.1.10 | 60000 | 192.168.1.2 | 80 | TCP |

FIG. 24

<IDENTIFICATION RESULT INFORMATION>

| SESSION NUMBER | PHYSICAL SPINE SWITCH AT ALLOCATION DESTINATION |
|---|---|
| 1 | Spine 2 |

SWITCH IDENTIFICATION METHOD AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2020-087239, filed on May 19, 2020, the entire contents of which are incorporated herein by reference.

FIELD

A certain aspect of embodiments described herein relates to a switch identification method and a non-transitory computer-readable storage medium.

BACKGROUND

As the virtualization technology has developed, cloud services for providing services using virtual machines operated by physical servers in a data center are becoming popular. An example of a network that connects those virtual machines to one another is a virtual extensible local area network (VXLAN). A VXLAN is a tunneling protocol for constructing a logical L2 (Layer 2) network in a L3 (Layer 3) network, and a large-scale network can be constructed with 24-bit VXLAN IDs in a data center.

An example of a network topology in the VLAN is a leaf-spine topology, In the leaf-spine topology, physical switches called leaf switches are connected to each virtual machine. The leaf switches are connected to one another by physical switches called spine switches. The leaf-spine topology is a two-layer topology that includes an overlay network between the leaf switches and the respective virtual machines, and an underlay network between the spine switches and the leaf switches. In this topology, a virtual machine can be added more easily than in a three-layer topology.

Further, an example of a routing method for scattering the load on a switch in the VXLAN is ECMP (Equal Cost Multi Path). In ECMP, a leaf switch transfers a packet to a spine switch of the next hop, in accordance with a hash table that associates the hash values of sessions with next hops.

A cloud service adopting such a VXLAN and ECMP might investigate the site of a failure in the network, in a case where the quality of communication between virtual machines is poor. However, in a case where the hash table of the leaf switches is not open to the public, the spine switch of the next hop cannot be identified, and it is not possible to know in which part of the network the investigation target packet is to flow. Note that the techniques related to the present disclosure is also disclosed m Japanese Patent Application Laid-Open No. 2017-38239.

SUMMARY

According to an aspect of the embodiments, there is provided a switch identification method implemented by a computer, the switch identification method including: sending a first packet to a first virtual switch emulating a first physical switch, and identifying a second virtual switch that is an allocation destination to which the first virtual switch allocates the first packet, and referring to a storage unit that stores a switch correspondence information that associates a second physical switch that is an allocation destination of the first physical switch with the second virtual switch, and identifying the second physical switch that is the allocation destination to which the first physical switch allocates a second packet emulated by the first packet.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 11 is a schematic diagram of Syslog information according to this embodiment.

FIG. 12 is a schematic diagram of network topology information according to this embodiment.

FIG. 14 is a schematic diagram of network interface information according to this embodiment.

FIG. 15 is a schematic diagram of routing table information according to this embodiment.

FIG. 16 is a schematic diagram of MAC table information according to this embodiment.

FIG. 17 is a schematic diagram of first session correspondence information according to this embodiment.

FIG. 18 is a schematic diagram of second session correspondence information according to this embodiment.

FIG. 23 is a schematic diagram of session information according to this embodiment.

FIG. 24 is a schematic diagram of identification result information according to this embodiment.

DESCRIPTION OF EMBODIMENTS

Prior to the description of this embodiment, the facts examined by the present inventor are explained.

Figure 1:
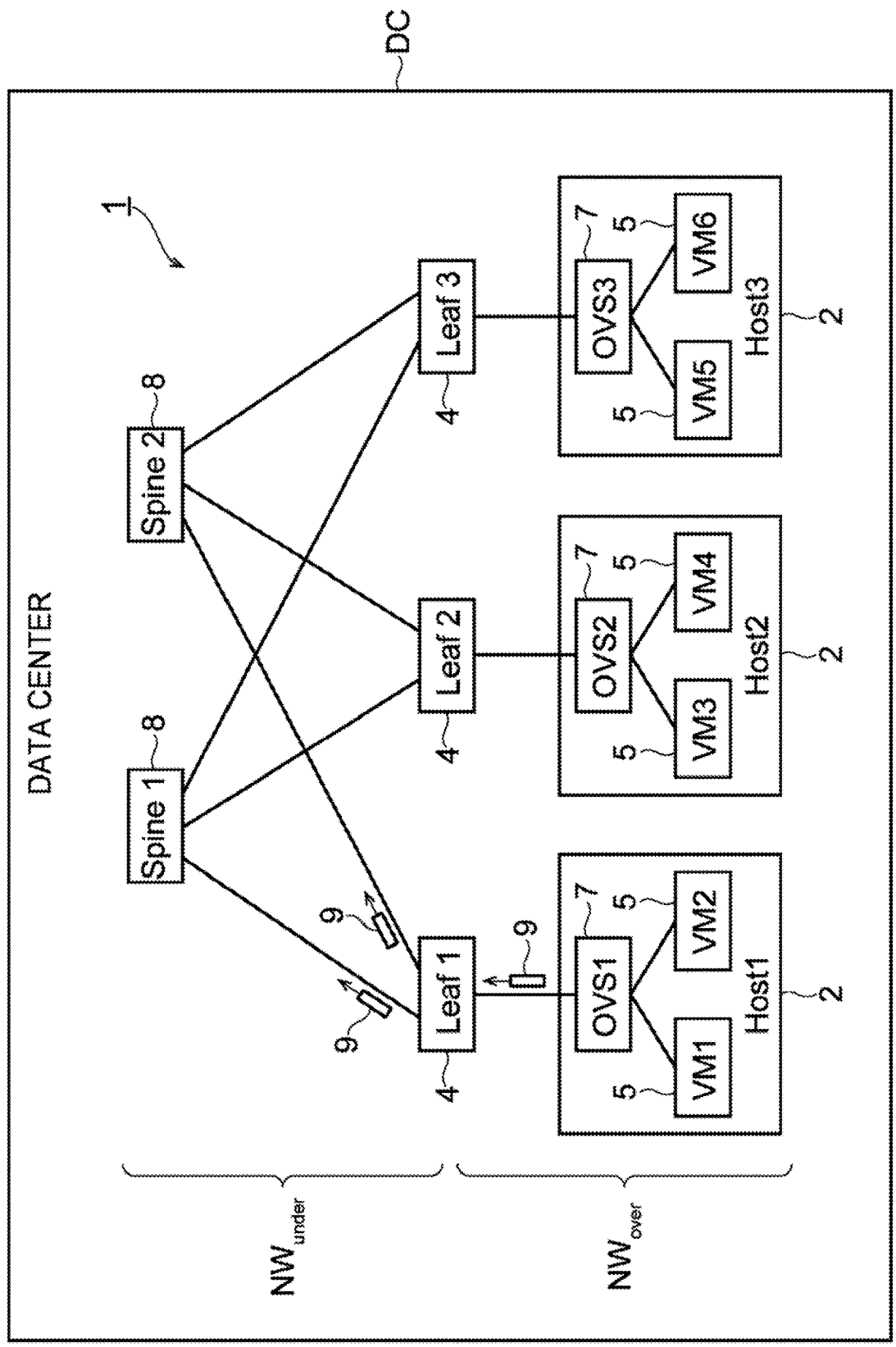
FIG. 1 is a network configuration diagram used in studies.

FIG. 1 is a network configuration diagram used in the examination.

This network 1 is a VXLAN that has a leaf-spine topology connecting the respective physical servers 2 in a data center DC, and is divided into an overlay network $NW_{over}$ and an underlay network $NW_{under}$.

Of these networks, the overlay network $NW_{over}$ is a network between each physical server 2 and physical leaf switches 4. In each physical server 2, virtual machines 5 and a virtual switch 7 are active. The physical leaf switches 4 are connected to the virtual machines 5 via the virtual switches 7.

Meanwhile, the underlay network $NW_{under}$ is a network between the physical leaf switches 4 and physical spine switches 8.

Hereinafter, the physical leaf switches 4 will be distinguished from one another by the names "Leaf 1" to "Leaf 3". The physical spine switches 8 will also be distinguished from one another by the names "Spine 1" and "Spine 2". Further, the virtual machines 5 will be distinguished from one another by the names "VM1" to "VM6".

With such a data center DC, a cloud service using the virtual machines 5 can be provided. Also, in this example, the physical leaf switches 4 determine the physical spine switches 8 as the allocation destinations of VXLAN packets 9 in accordance with ECMP in the manner described below.

Figure 2:
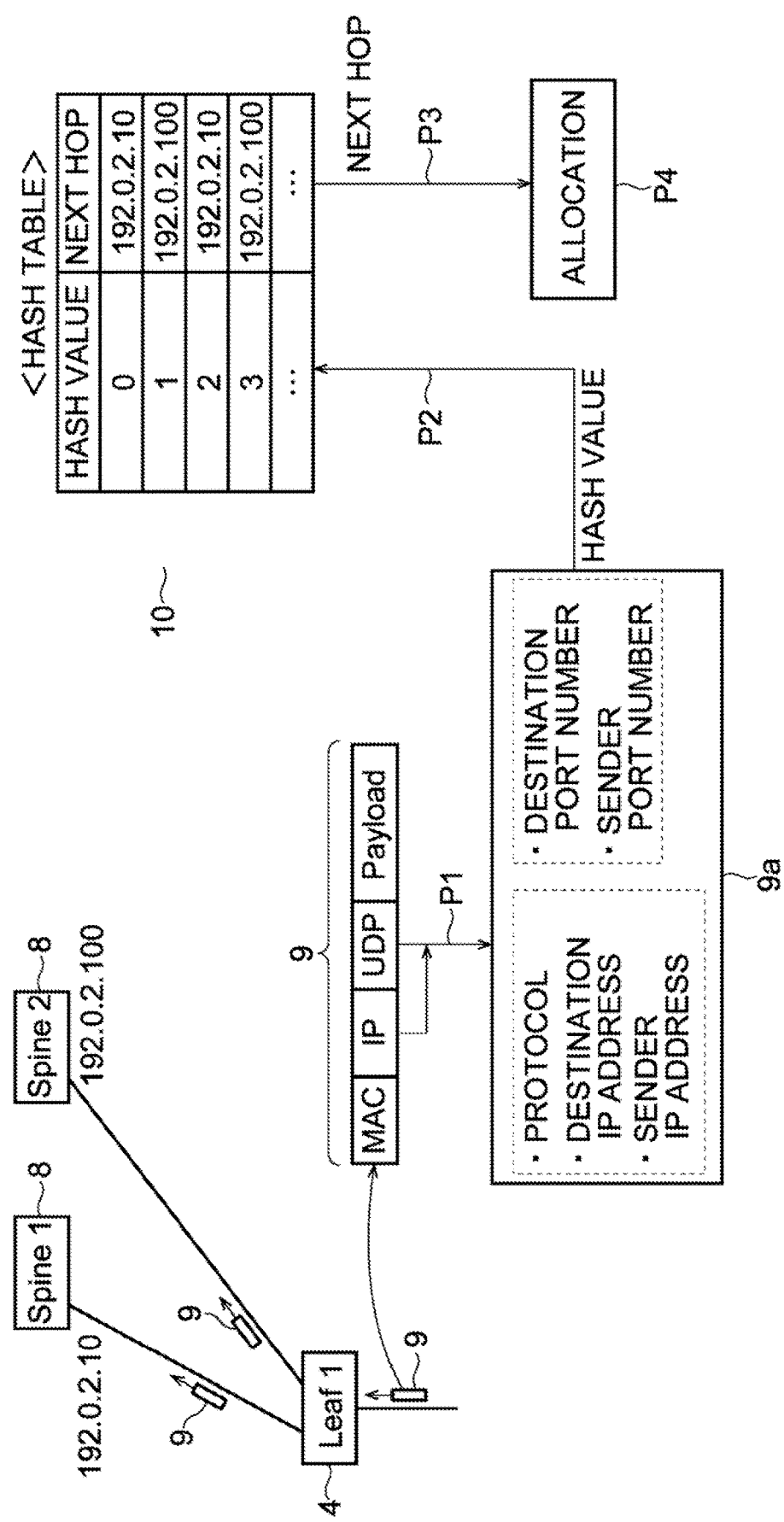
FIG. 2 is a schematic diagram for explaining an allocation process according to ECMP.

FIG. 2 is a schematic diagram for explaining an allocation process to be performed by the physical leaf switch 4 of "Leaf 1" according to ECMP.

First, the physical leaf switch 4 acquires a session 9a of the VXLAN packet 9 (P1). The session 9a is information defined by 5-tuple information: the protocol, the destination internet protocol (IP) address, the sender IP address, the destination port number, and the sender port number. Note that, the protocol, the destination IP address, and the sender IP address can be acquired from the IP packet of the VXLAN packet 9. Meanwhile, the destination port number and the sender port number can be acquired from the user datagram protocol (UDP) segment of the VXLAN packet 9.

Next, the physical leaf switch 4 calculates a hash value from the session 9a, using the hash calculation algorithm of ECMP (P2). The physical leaf switch 4 further refers to a hash table 10 stored in a storage unit in the device, to identify the IP address of the next hop corresponding to the hash value (P3).

The physical leaf switch 4 then allocates the VXLAN packet 9 to the identified next hop (P4).

A case where the manager of the network 1 has received an inquiry about poor communication quality of the virtual machine 5 from a user of a cloud service is now discussed. In that case, the manager investigates at which portion in the physical leaf switches 4 and the physical spine switches 8 the failure has occurred.

If the manager can check the contents of the hash tables 10 of the physical leaf switches 4, the manager can identify the physical spine switch 8 of the next hop corresponding to the hash value. Accordingly the manager can identify the physical spine switch 8 that is the allocation destination of the VXLAN packet 9 transmitted from the virtual machine 5 of the user. With this being a clue, the manager can identify the portion at which the failure has occurred in the network 1.

However, in a case where the manufacturer of the physical leaf switches 4 has not made the contents of the hash tables 10 open to the public, the manager is unable to identify the next hop corresponding to the hash value of the VXLAN packet 9. Therefore, the manager fails to identify the physical spine switch 8 through which the VXLAN packet 9 passes, and becomes unable to investigate at which portion in the network 1 the failure has occurred.

To solve this, the path of the VXLAN packet 9 may be identified in the manner described below.

Figure 3:
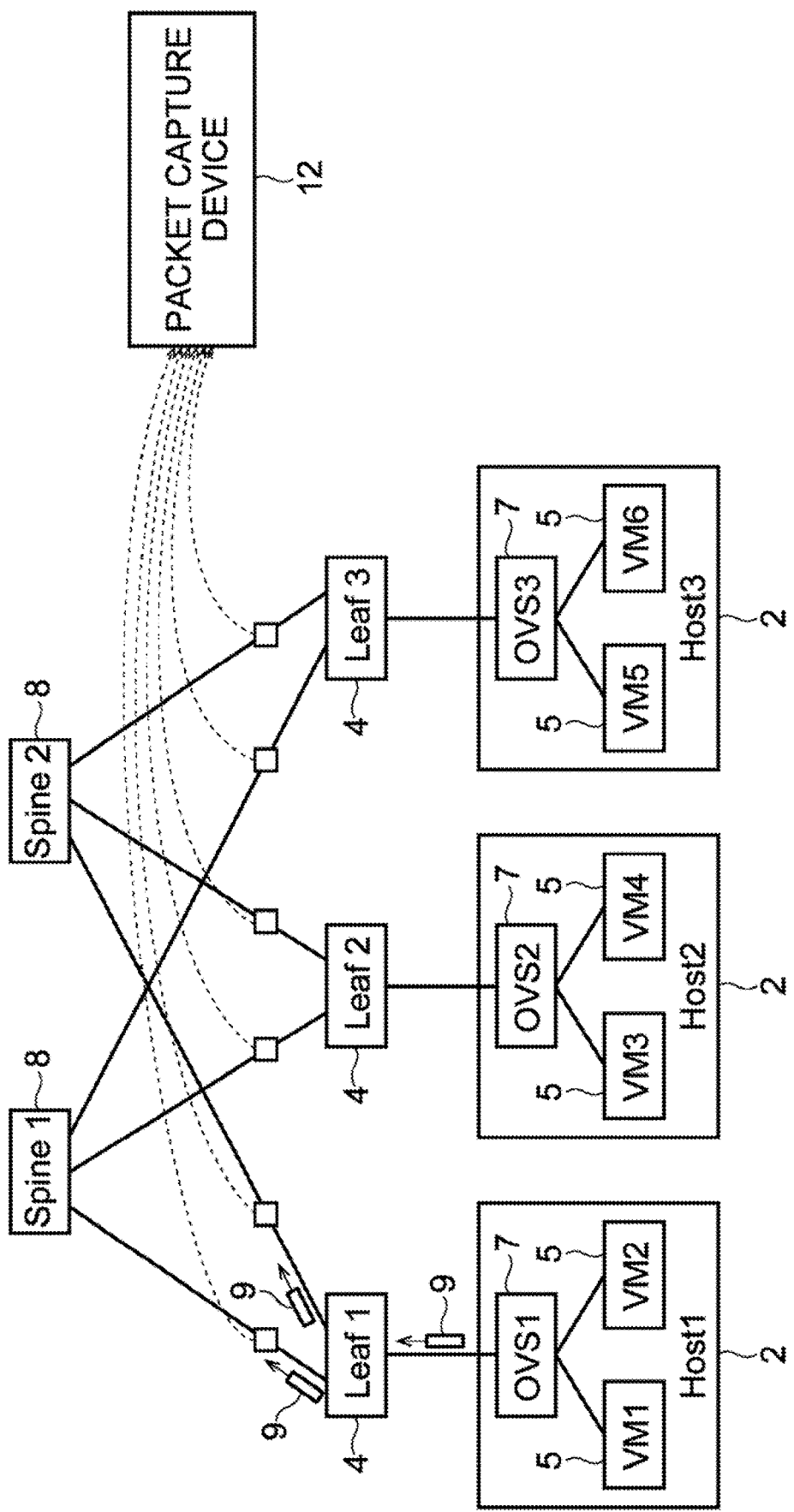
FIG. 3 is a schematic diagram illustrating a method for identifying the paths of VXLAN packets.

FIG. 3 is a schematic diagram illustrating a method for identifying the paths of the VXLAN packets 9.

According to this method, a packet capture device 12 is connected to all the paths between the physical leaf switches 4 and the physical spine switches 8. The packet capture device 12 captures the VXLAN packet 9, so that the path of VXLAN packet 9 can be identified.

However, this increases the cost for connecting the packet capture device 12 to all the paths between the physical leaf switches 4 and the physical spine switches 8. Furthermore, the network 1 needs to be suspended to connect the packet capture device 12 to the network 1. This will lower the availability of cloud services using the data center DC.

Alternatively, the path of the VXLAN packet 9 may be identified in the manner described below.

Figure 4:
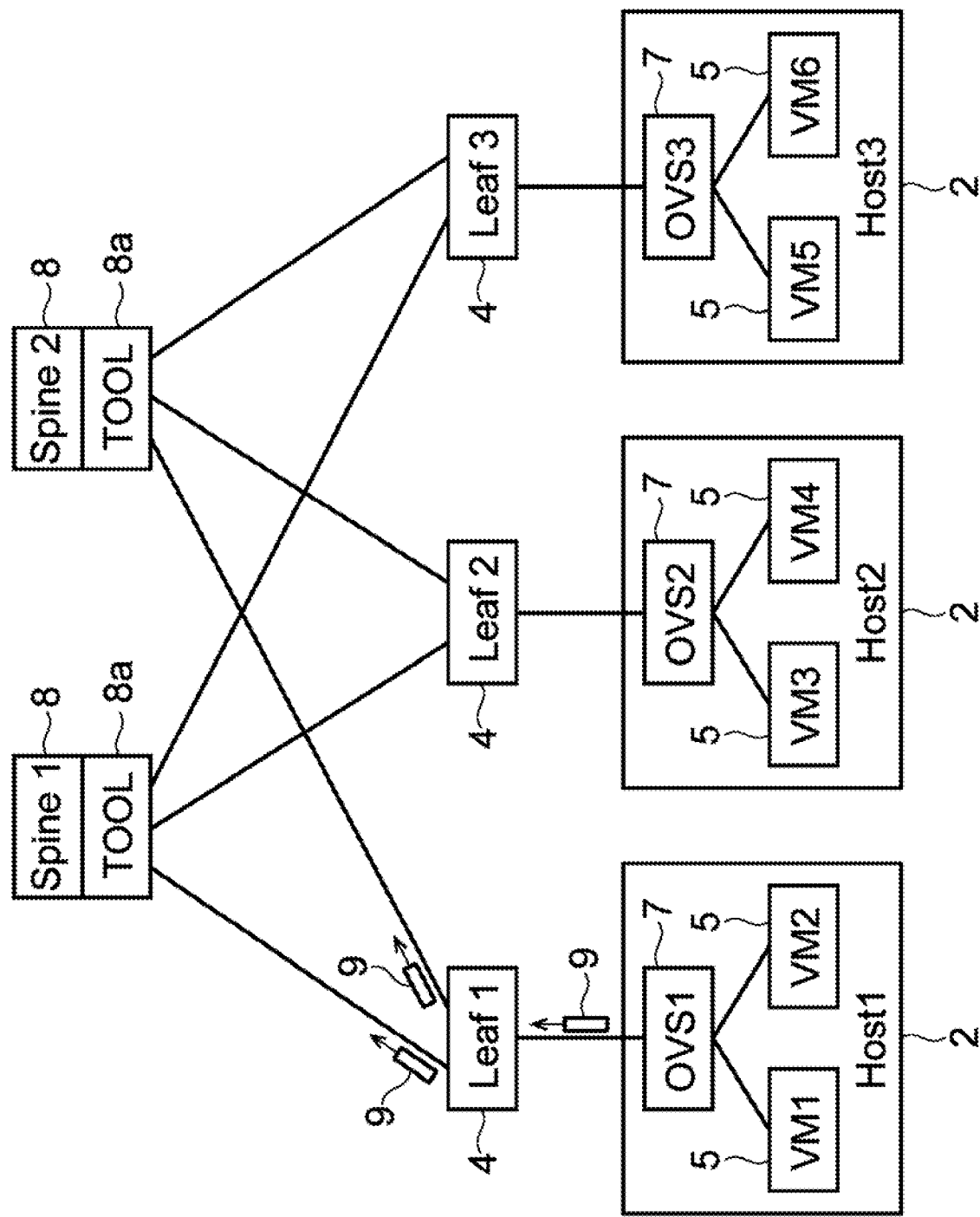
FIG. 4 is a schematic diagram illustrating another method for identifying the paths of VXLAN packets.

FIG. 4 is a schematic diagram illustrating another method for identifying the paths of the VXLAN packets 9.

According to this method, packet investigation tools 8a included in the physical spine switches 8 are used to identify the paths of the VXLAN packets 9. The packet investigation tool 8a is a tool that outputs header information about the VXLAN packet 9 including the designated session 9a (see FIG. 2), when the VXLAN packet 9 flows in the physical spine switch 8. The manager then checks the header information. By doing so, the manager can check which path in the network the VXLAN packet 9 passes through.

However, this execution of the packet investigation tool 8a increases the load on the physical spine switch 8, resulting in a problem such as an increase in network latency.

Embodiment

Next, the system configuration of a system according to this embodiment is described.

Figure 5:
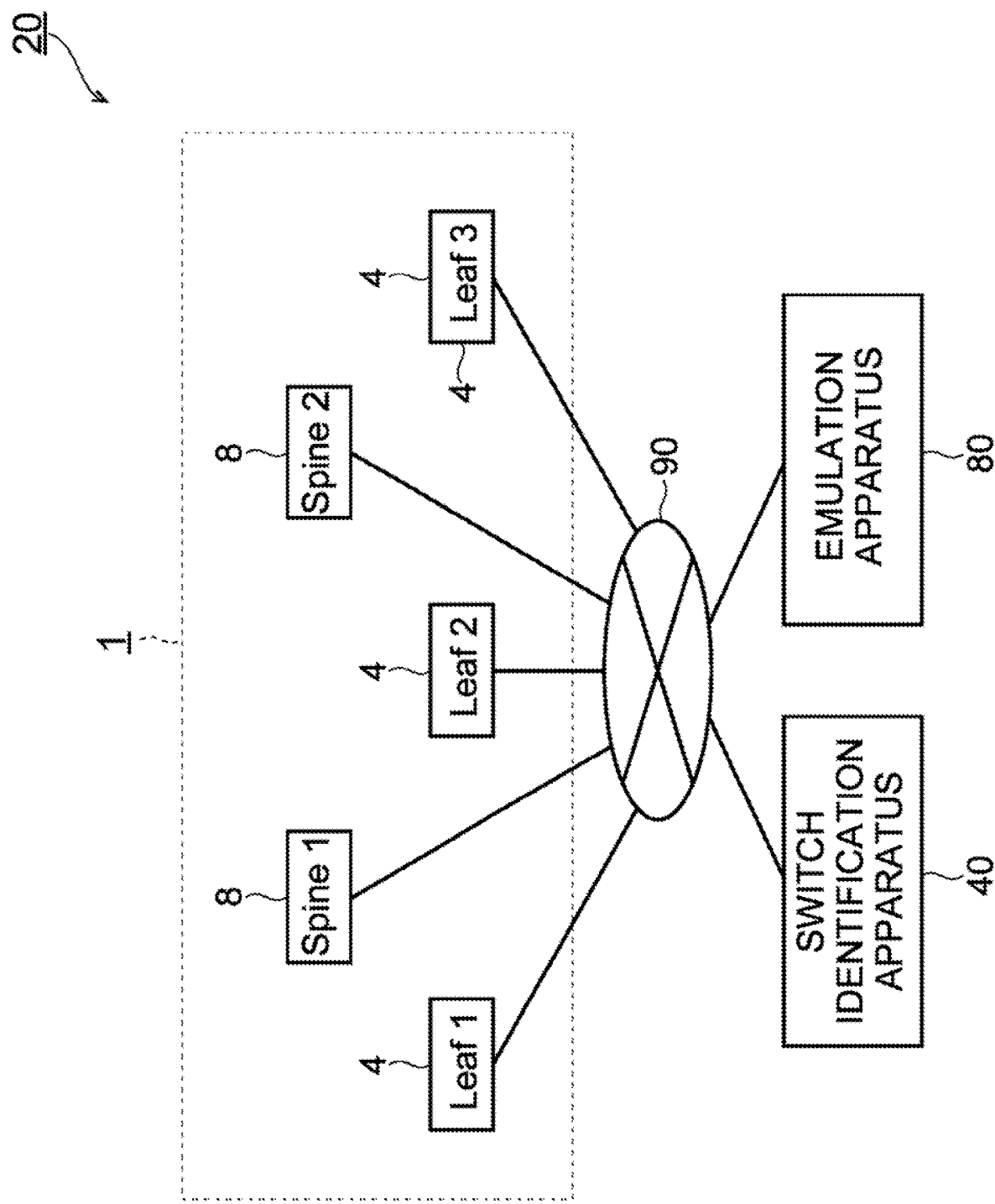
FIG. 5 is a system configuration diagram of a system according to an embodiment.

FIG. 5 is a system configuration diagram of a system according to this embodiment. In FIG. 5, the same components as those described with reference to FIG. 1 are denoted by the same reference numerals as those used in FIG. 1, and explanation of them will not be repeated below.

This system 20 is a system for identifying the physical spine switches 8 as the allocation destinations of the physical leaf switches 4 in a network 1, and includes a switch identification apparatus 40 and an emulation apparatus 80.

In this system 20, the network 1 is a VXLAN having a leaf-spine topology, like the one in FIG. 1. Although the connections between the physical leaf switches 4 and the physical spine switches 8 are not shown to prevent complication in the illustration in FIG. 5, the network 1 has the same leaf-spine topology as that shown in FIG. 1.

Meanwhile, the switch identification apparatus 40 is a physical server that identifies the physical spine switches 8 of the allocation destinations of the physical leaf switches 4. The switch identification apparatus 40 is connected to the physical leaf switches 4 and the physical spine switches 8 in the network 1 via a management network 90 such as a local area network (LAN).

The emulation apparatus 80 is a physical server that constructs an emulation environment that emulates the network 1, and is connected to the switch identification apparatus 40 via the management network 90.

In this embodiment, the emulation environment constructed by the emulation apparatus is used to identify the path in which a VXLAN packet flows in the network 1 of the actual environment.

Figure 6:
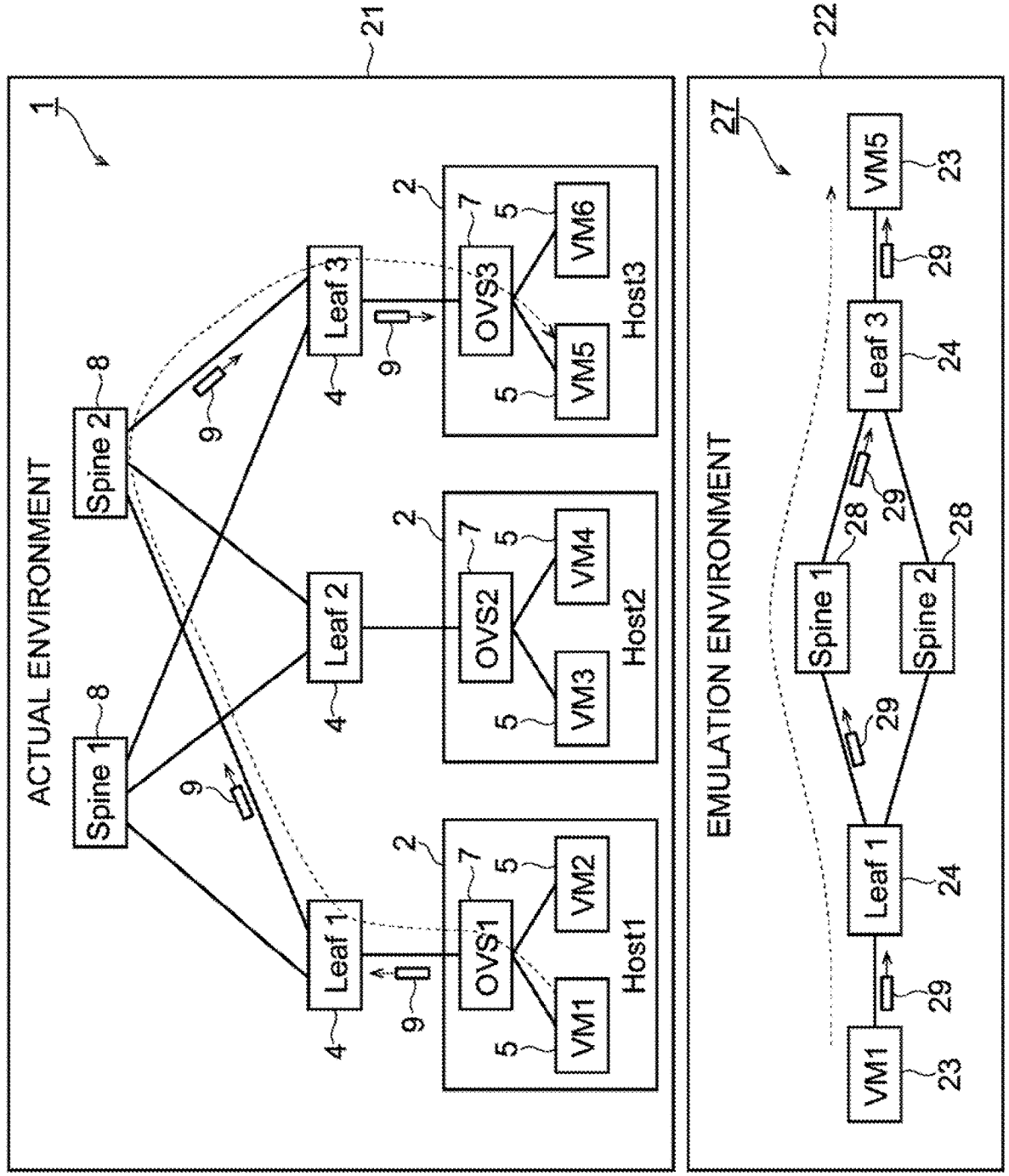
FIG. 6 is a schematic diagram of an actual environment and an emulation environment in this embodiment.

FIG. 6 is a schematic diagram for explaining an actual environment and an emulation environment.

As shown in FIG. 6, the network 1 in an actual environment 21 has the same physical configuration and logical configuration as those explained with reference to FIG. 1, and includes the physical leaf switches 4 and the physical spine switches 8.

Each of the physical leaf switches 4 is an example of the first physical switch, and each of the physical spine switches 8 is an example of the second physical switch. The VXLAN packet 9 flowing in the network 1 of the actual environment 21 is an example of the second packet.

Meanwhile, the emulation environment 22 is an environment the emulation apparatus 80 has constructed in terms of software in the apparatus, and includes a virtual network 27. The virtual network 27 is a network that emulates the network in which the investigation target packets flow in the network 1 in the actual environment 21.

A case where the transfer path of the VXLAN packet 9 the virtual machine 5 of "VM1" has transmitted to the virtual machine of "VM5" is to be investigated is now discussed. In this case, the emulation apparatus 80 constructs the virtual network 27 including the respective virtual machines of the sender and the destination of the VXLAN packet 9, and all the switches through which the VXLAN packet 9 may flow.

In this example, the emulation apparatus 80 places two pseudo virtual machines 23 that emulate the respective virtual machines 5 of "VM1" and "VM5" in the virtual network 27.

The emulation apparatus 80 further places two virtual leaf switches 24 that emulate the respective physical leaf switches 4 of "Leaf 1" and "Leaf 2" in the virtual network 27. The emulation apparatus 80 also places two virtual spine switches 28 that emulate the respective physical spine switches 8 of "Spine 1" and "Spine 2" in the virtual network 27. Note that the virtual leaf switches 24 are an example of the first virtual switch, and the virtual spine switches 28 are an example of the second virtual switch.

The emulation apparatus 80 does not need to emulate all the networks in the actual environment, and is only required to emulate the network(s) in which the investigation target VXLAN packet 9 might flow.

The switch identification apparatus 40 then sends an investigation packet 29 that emulates the investigation target VXLAN packet 9 to the virtual network 27. The investigation packet 29 is a packet that has the same session the session 9a (see FIG. 2) of the VXLAN packet 9. As for the fields other than the session, the VXLAN packet 9 and the investigation packet 29 may differ from each other. Note that the investigation packet 29 is an example of the first packet.

When the investigation packet 29 is sent to the virtual network 27 as above, the transfer path of the investigation packet 29 might become the same as the transfer path of the VXLAN packet 9 in the network 1 of actual environment 21. However, the contents of the hash table 10 (see FIG. 2) of the physical leaf switch 4 of the actual environment vary with change in the network interface of the physical leaf switch 4. Therefore, there is no guarantee that the contents of the hash tables 10 will be the same in the actual environment 21 and an emulation environment 22, and the investigation packet 29 in the emulation environment 22 does not necessarily pass through the same transfer path as that in the actual environment 21.

This aspect is further described below, with reference to FIG. 7.

Figure 7A:
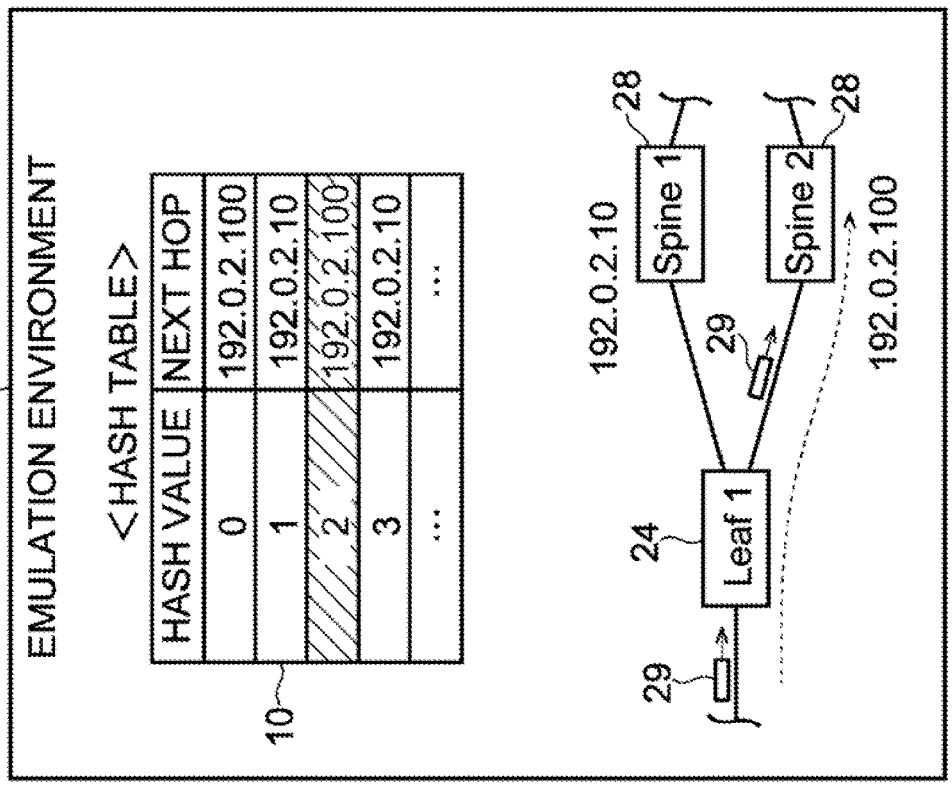
FIG. 7A is a schematic diagram of hash table of physical leaf switches in an actual environment according to this embodiment.

FIG. 7A is a schematic diagram of the hash table 10 of the physical leaf switch 4 of "Leaf 1" in the actual environment 21.

In the actual environment 21, the physical leaf switch 4 transfers the VXLAN packet 9 having a hash value "2" to the physical spine switch 8 of "Spine 1" having the next hop IP address "192.0.2.10".

Figure 7B:
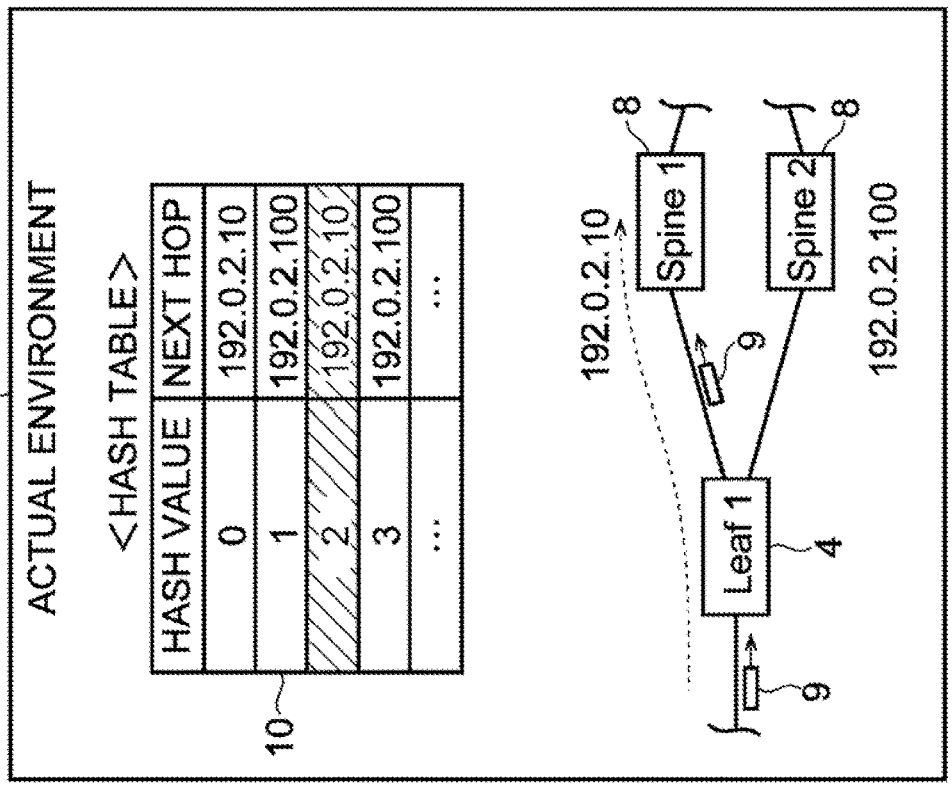
FIG. 7B is a schematic diagram of a hash table of virtual leaf switches in an emulation environment according to this embodiment.

FIG. 7B is a schematic diagram of the hash table of the virtual leaf switch 24 of "Leaf 1" in the emulation environment 22.

In the emulation environment 22, the virtual leaf switch 24 transfers the investigation packet 29 having a hash value "2" to the virtual spine switch 28 of "Spine 2" having the next hop IP address "192.0.2.100".

As described above, even when the respective bash values of the VXLAN packet 9 and the investigation packet 29 are the same, the allocation destinations might differ from each other as the contents of the hash tables 10 differ between the actual environment 21 and the emulation environment 22.

There are several reasons that the contents of the hash tables 10 differ between the actual environment 21 and the emulation environment 22. For example, the respective rows of the hash table 10 are generated in the order of activation of the network devices connected to the physical leaf switches 4 and the virtual leaf switches 24. Therefore, if the order of activation of the network devices is different between the actual environment 21 and the emulation environment 22, the contents of the hash tables 10 might vary as described above.

Also, there are cases where the contents of the hash tables 10 are rewritten due to a change in the interface of the physical leaf switch 4 or the virtual leaf switch 24 during operation of the network. For example, if a port haying a switch performs downlink or uplink, the hash tables 10 are rewritten, with the downlink or the uplink being the trigger. In this case, the contents of the hash tables 10 also differ between the actual environment 21 and the emulation environment 22 as described above.

Next, the properties of the hash table 10 in ECNIP are explained.

Figure 8:
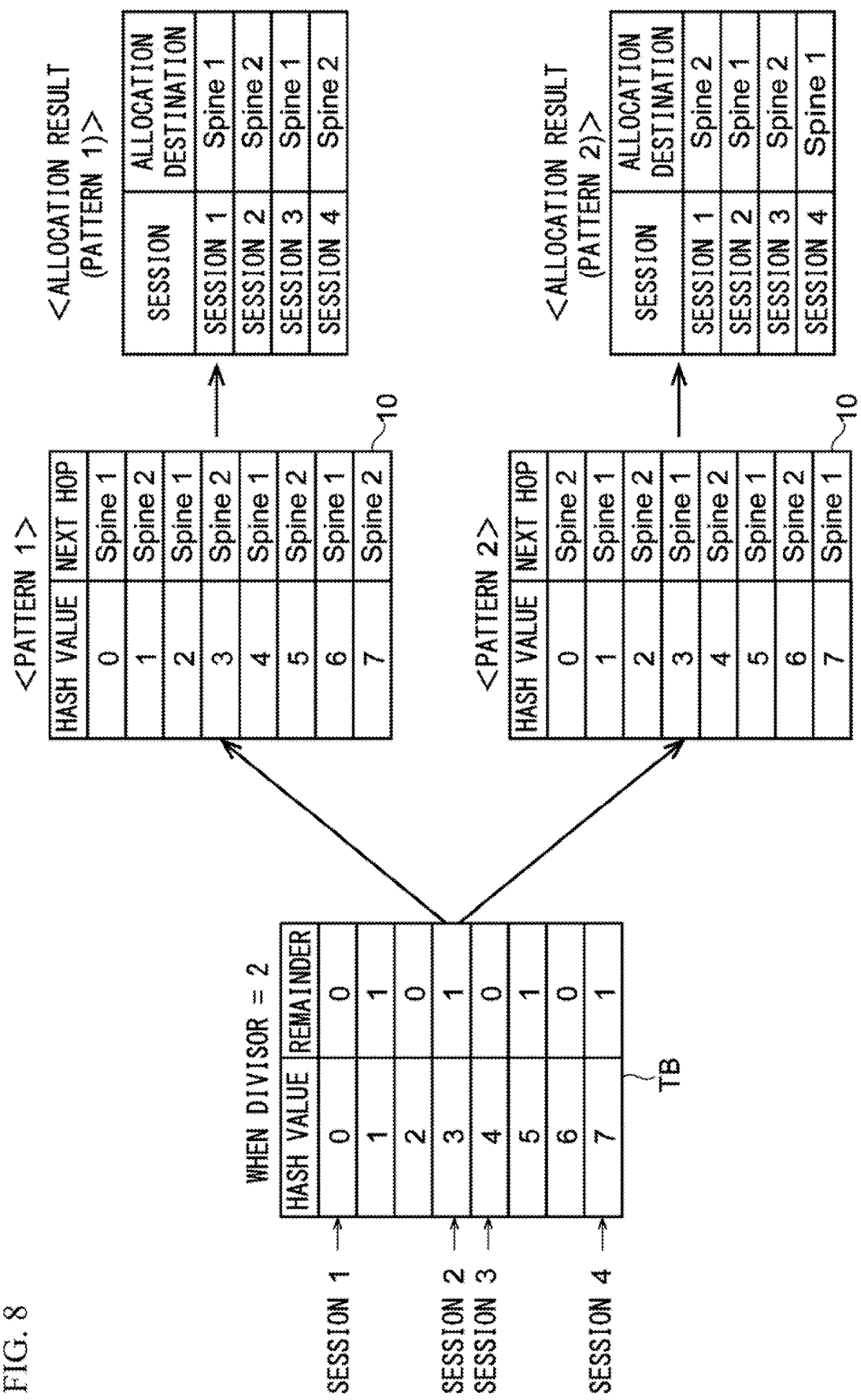
FIG. 8 is a schematic diagram illustrating the properties of a hash table according to ECM.

FIG. 8 is a schematic diagram illustrating the properties of the hash table 10 in ECMP.

A table TB is a table showing the remainders in a case where hash values are divided by the total number of allocation destinations of the physical leaf switch 4. Here, the physical spine switches 8 as the allocation destinations of each physical leaf switch 4 are the two switches "Spine 1" and "Spine 2" as in FIG. 6, and the total number of allocation destinations is "2". A remainder in this case is either "0" or "1". Further, the respective hash values of sessions 1 to 4 are "0", "3", "4", and "7".

The hash table 10 has such properties that the VXLAN packets 9 having the session 9a with the same remainder are allocated to the same allocation destination. Since there are only two remainders "0" and "1" in this example, candidates for the hash table 10 are the following two patterns, "pattern 1" and "pattern 2".

In the pattern 1, all VXLAN packets 9 having "0" as the remainder of the session 9a are allocated to the physical spine switch 8 of "Spine 1", and all VXLAN packets 9 having "1" as the remainder of the session 9a are allocated to the physical spine switch 8 of "Spine 2". In this case, the allocation destination of the sessions 1 and 3 is "Spine 1", and the allocation destination of the sessions 2 and 4 is "Spine 2".

In the pattern 2, on the other hand, all VXLAN packets 9 having "0" as the remainder of the session 9a are allocated to the physical spine switch 8 of "Spine 2", and all VXLAN packets 9 having "1" as the remainder of the session 9a are allocated to the physical spine switch 8 of "Spine 1". In this case, the allocation destination of the sessions 1 and 3 is "Spine 2", and the allocation destination of the sessions 2 and 4 is "Spine 2".

With such properties, the number of candidates for the hash table 10 is only the same as the total number of allocation destinations. Even if the hash table 10 is not open to the public, the contents thereof can be estimated to a certain extent.

Next, the outline of a switch identification method according to this embodiment using the above emulation environment 22 is described.

Figure 9:
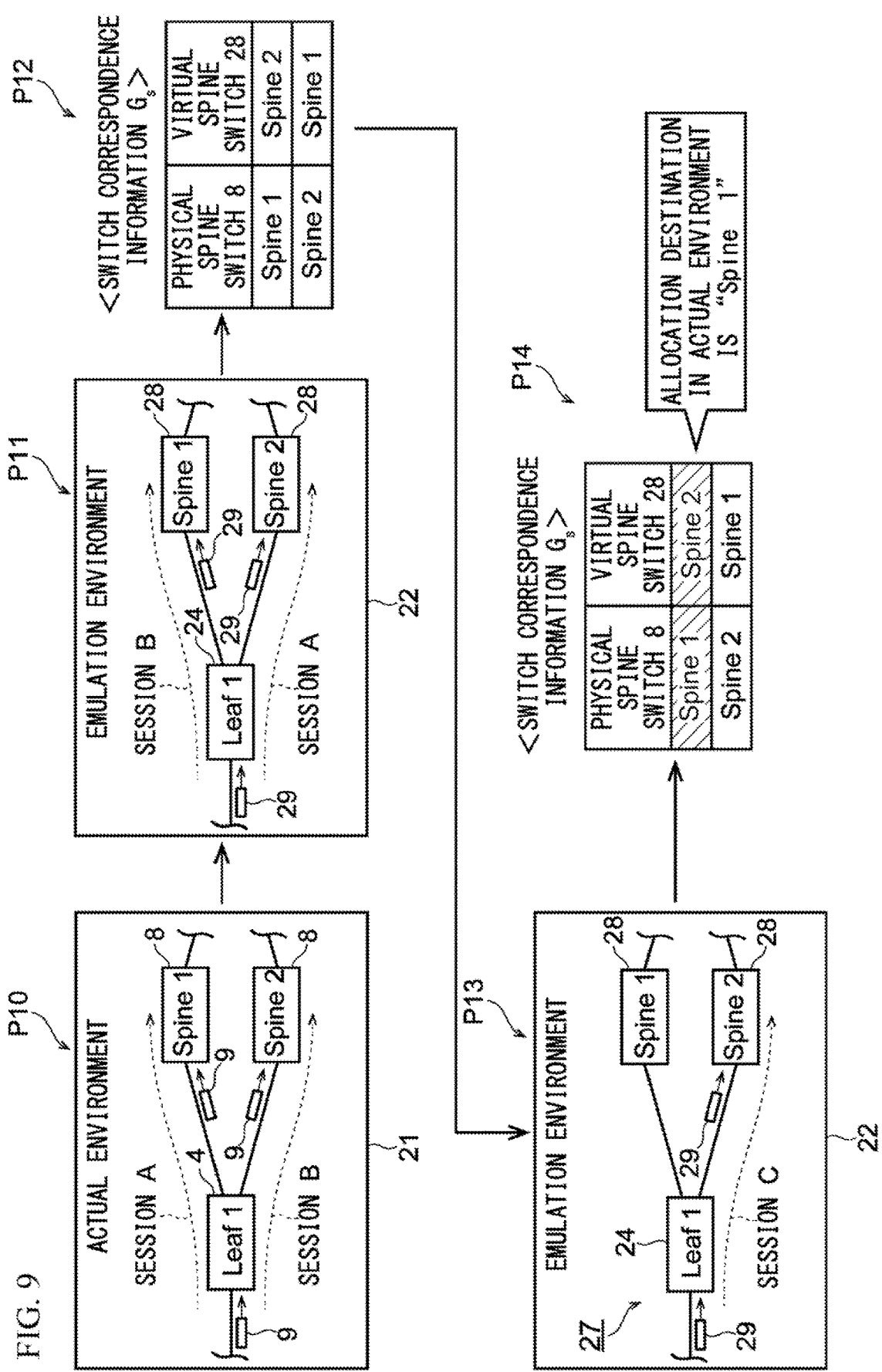
FIG. 9 is a schematic diagram illustrating the outline of a switch identification method according to this embodiment.

FIG. 9 is a schematic diagram illustrating the outline of the switch identification method according to this embodiment.

First, the switch identification apparatus 40 captures the VXLAN packet 9 flowing in the actual environment 21, and identifies the physical spine switch 8 of the allocation destination of the VXLAN packet 9 (P10). For example, the switch identification apparatus 40 accesses the physical leaf switch 4 of "Leaf 1", to capture the VXLAN packet 9 flowing in the physical leaf switch 4.

In this example, the switch identification apparatus 40 captures both VXLAN packets of "session A" and "session B" to be allocated to the respective physical spine switches 8 of "Spine 1" and "Spine 2".

Next, the emulation apparatus 80 constructs the emulation environment 22. The switch identification apparatus 40 then sends investigation packets 29 emulating the respective VXLAN packets 9 of "session A" and "session B" to the virtual network in the emulation environment 22 (P11). After that, the switch identification apparatus 40 identifies the virtual spine switches 28 of the allocation destinations of the investigation packets 29 in the emulation environment 22. Here, the investigation packet 29 of the session A is allocated to the virtual spine switch 28 of "Spine 2", and the investigation packet 29 of the session B is allocated to the virtual spine switch 28 of "Spine 1".

Next, the switch identification apparatus 40 associates the allocation destination "Spine 1" of the VXLAN packet 9 of "session A" with the allocation destination "Spine 2" of the investigation packet 29 of "session A", and stores these associated destinations into switch correspondence information $G_s$ (P12). Likewise, the switch identification apparatus 40 associates the allocation destination "Spine 2" of the VXLAN packet 9 of "session B" with the allocation destination "Spine 1" of the investigation packet 29 of "session B", and stores these associated destinations into the switch correspondence information $G_s$.

The switch identification apparatus 40 then sends the investigation packet 29 of "session C" to the virtual network 27 in the emulation environment 22, and identifies the virtual spine switch 28 of the allocation destination of the investigation packet 29 (P13). "Session C" is a session of the VXLAN packet 9 transmitted from the virtual machine 5 of a user who has made an inquiry as to poor communication quality. In this example, the investigation packet 29 of "session C" is allocated to the virtual spine switch 28 of "Spine 2".

After that, the switch identification apparatus 40 identifies the physical spine switch 8 corresponding to the identified allocation destination, on the basis of the switch correspondence information $G_s$ (P14). In the switch correspondence information $G_s$ shown in FIG. 9, the virtual spine switch 28 of "Spine 2", which is the allocation destination of the investigation packet 29 of "session C", corresponds to the physical spine switch 8 of "Spine 1". Accordingly, when the VXLAN packet 9 of "session C" flows in the actual environment 21, it is possible to identify the physical spine switch 8 of "Spine 1" as the allocation destination of the VXLAN packet 9.

Through the above process, the manager can identify the physical spine switch 8 of the allocation destination in the actual environment 21.

Next, the functional configuration of the switch identification apparatus 40 is described.

Figure 10:
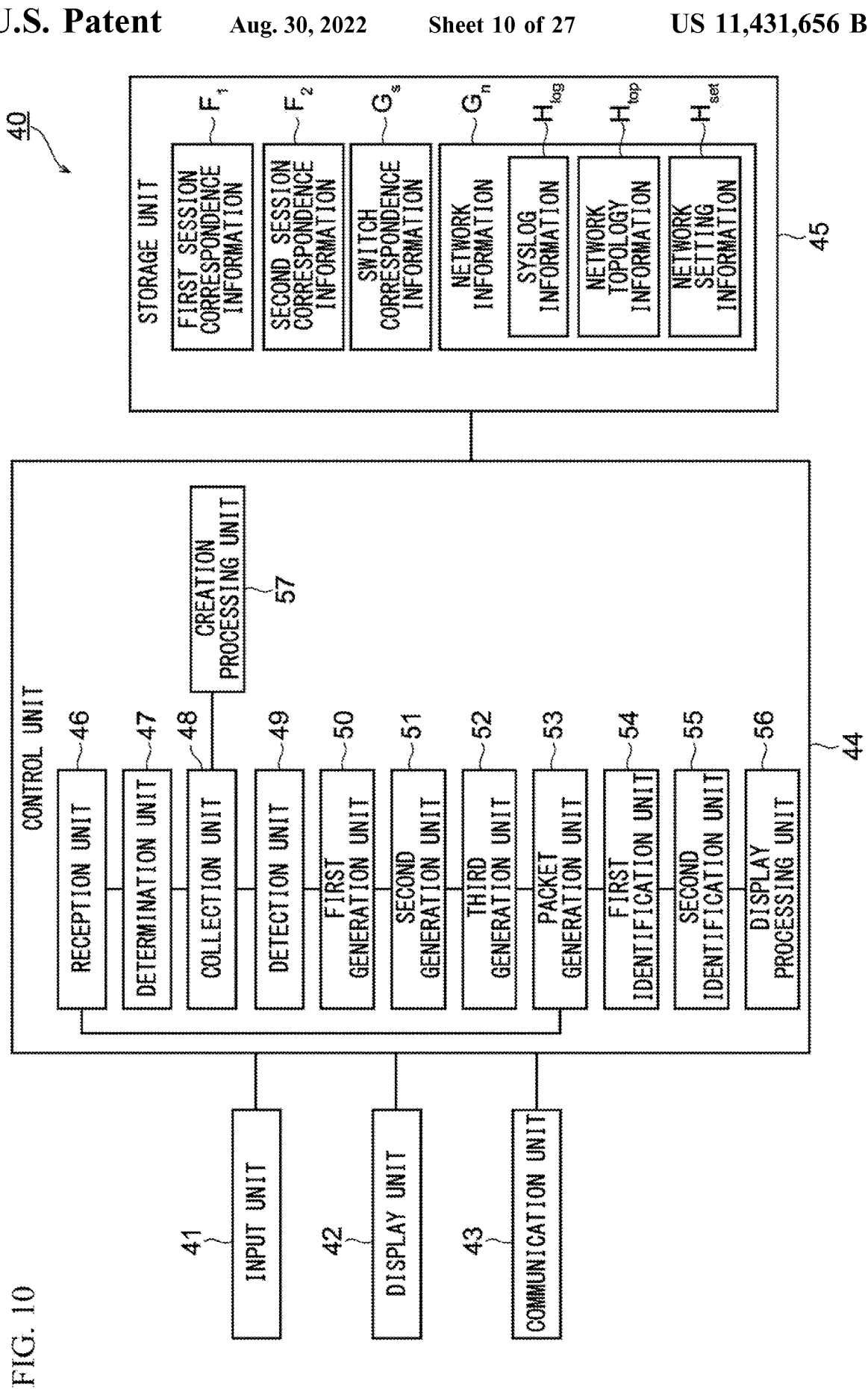
FIG. 10 is a functional configuration diagram of a switch identification apparatus according to this embodiment.

FIG. 10 is a functional configuration diagram of the switch identification apparatus 40. As shown in FIG. 10, the switch identification apparatus 40 includes an input unit 41, a display unit 42, a communication unit 43, a control unit 44, and a storage unit 45.

Of these components, the input unit 41 is a processing unit that receives an operation from the manager or the like, and inputs operation information indicating the details of the received operation to the control unit 44.

The display unit 42 is a processing unit that displays various kinds of information. For example, the display unit 42 displays a screen or the like that prompts the manager or the like to make an input. The display unit 42 further displays a transfer path in a case where the switch identification apparatus 40 has successfully identified the transfer path of the investigation target VXLAN packet 9.

The communication unit 43 is a communication interface that performs communication with the management network 90 (see FIG. 5).

The control unit 44 is a processing unit that controls the respective components of the switch identification apparatus 40, in this example, the control unit 44 includes a reception unit 46, a determination unit 47, a collection unit 48, a detection unit 49, first to third generation units 50 to 52, a packet generation unit 53, a first identification unit 54, a second identification unit 55, a display processing unit 56, and a creation processing unit 57.

Of these components, the reception unit 46 is a processing unit that receives, from the manager, an instruction for identifying the physical spine switch 8 of the allocation destination of the investigation target VXLAN packet 9. The instruction also includes session information indicating the session 9a (see FIG. 2) of the VXLAN packet 9. The reception unit 46 further receives, from the manager, a monitor end instruction for ending the monitoring of the network 1.

The determination unit 47 is a processing unit that determines whether the reception unit 46 has received a monitor end instruction.

The collection unit 48 is a processing unit that collects network information $G_n$ from each of the physical leaf switches 4 and the physical spine switches 8, and stores the network information $G_n$ into the storage unit 45, when the determination unit 47 determines that any monitor end instruction has not been received. The network information $G_n$ includes the following information: Syslog information $H_{log}$, network topology information $H_{top}$, and network setting information $H_{set}$.

FIG. 11 is a schematic diagram of the Syslog information $H_{log}$.

The Syslog information $H_{log}$ is information generated by the respective physical leaf switches 4, and is information that associates the name (NW I/F name) of the network interface of the apparatus and its status with network device names. Note that the network device names are character strings such as "Leaf1" and "Leaf2" for identifying the respective physical leaf switches 4. The status of NW I/F may be uplink, downlink, or the like.

Each physical leaf switch 4 transmits the Syslog information $H_{log}$ to the switch identification apparatus 40 when the status of the network interface changes. The times included in the Syslog information $H_{log}$ indicate the times at which the interface status changes as above.

FIG. 12 is a schematic diagram of the network topology information $H_{top}$.

The network topology information $H_{top}$ is information generated by the respective physical leaf switches 4. In this example, the NW I/F names of the physical leaf switches 4, the names of the network devices at the connection destinations, and the NW I/F names of the network devices at the connection destinations are associated with the network devices, and are stored into the network topology information $H_{top}$.

Figure 13:
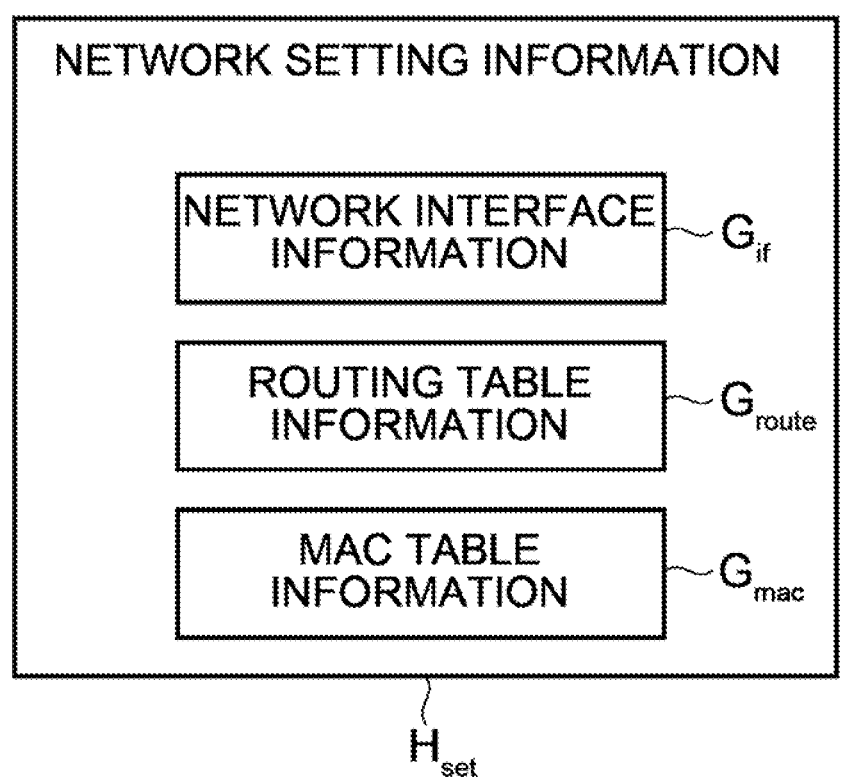
FIG. 13 is a schematic diagram of network setting information according to this embodiment.

FIG. 13 is a schematic diagram of the network setting information $H_{set}$.

As shown in FIG. 13, the network setting information $H_{set}$ includes the following information: network interface information $G_{if}$, routing table information $G_{route}$, and media access control (MAC) table information $G_{mac}$.

FIG. 14 is a schematic diagram of the network interface information $G_{if}$.

The network interface information $G_{if}$ is information generated by the respective network devices that are the physical leaf switches 4 and the physical spine switches 8. Here, the NW I/F names and the IP addresses of the respective NW I/Fs are associated with the network device names, and are stored in the network interface information $G_{if}$.

FIG. 15 is a schematic diagram of the routing table information $G_{route}$.

The routing table information $G_{route}$ is information indicating the routing table of the respective network devices that are the physical leaf switches 4 and the physical spine switches 8. For example, in the routing table information $G_{route}$, destination networks and the respective IP addresses of next hops are associated with the respective network device names. Further, administrative distance (AD) values and metrics are also associated with the respective network device names, and are stored in the routing table information $G_{route}$.

FIG. 16 is a schematic diagram of the MAC table information $G_{mac}$.

The MAC table information $G_{mac}$ is information that associates destination MAC addresses and next hop networks with the network device names of the physical leaf switches 4 and the like.

Referring back to FIG. 10, explanation is continued.

The detection unit 49 is a processing unit that refers to the Syslog information $H_{log}$ (FIG. 11) to determine whether there is a change in the network interfaces of the physical leaf switches 4.

The creation processing unite 57 performs a process of creating the virtual network 27, on the basis of the network information $G_n$ described above. In this example, the creation processing unit 57 notifies the emulation apparatus 80 of a creation request for the virtual network 27 on the basis of the network information $G_n$.

Meanwhile, the first generation unit 50 generates first session correspondence information $F_1$ by capturing the VXLAN packets 9 flowing in the respective physical leaf switches 4 in the actual environment 21, and stores the First session correspondence information $F_1$ into the storage unit 45. The contents to be captured by the first generation unit 50 are the sessions 9a and the allocation destinations of the VXLAN packets 9.

FIG. 17 is a schematic diagram of the first session correspondence information $F_1$.

As shown in FIG. 17, the first session correspondence information $F_1$ is information that associates the sessions 9a of the VXLAN packets 9 in the actual environment 21 with the physical spine switches 8 as the destinations of allocation performed by the physical leaf switches 4.

As described above with reference to FIG. 2, the session 9a is information defined by 5-tuple information: the protocol, the destination IP address, the sender IP address, the destination port number, and the sender port number. Here, information about the sender is written before the symbol "→" in the session 9a, and information about the destination and the protocol are written after the symbol "→". For example, in a session "192.168.1.10:60000→192.168.1.2:80/tcp", "192.168.1.10:60000" indicates that the IP address of the sender is "192.168.1.10", and the port number of the sender is "60000". Further, "192.168.1.2:80/tcp" indicates that the IP address of the destination is "192.168.1.2", and the port number of the destination is "80". Furthermore, "tcp" indicates that the protocol is tcp (transmission control protocol).

The first generation unit 50 also captures the destination MAC address of a next hop the physical leaf switch 4 has written into the VXLAN packet 9. By doing so, the first generation unit 50 can identify the physical spine switch 8 that is the allocation destination of the VXLAN packet 9.

The first generation unit 50 further captures the VXLAN packets 9 until the VXLAN packets 9 are allocated to all the allocation destinations of one physical leaf switch 4. In this example, the allocation destinations of the physical leaf switch 4 is the two physical spine switches 8 of "Spine 1" and "Spine 2". Therefore, the first generation unit 50 captures the VXLAN packets 9 until the VXLAN packets 9 are allocated to these two physical spine switches 8.

Referring back to FIG. 10, explanation is continued.

The second generation unit 51 is a processing unit that generates second session correspondence information $F_2$ by sending investigation packets 29 to the virtual leaf switches 24, and stores the second session correspondence information $F_2$ into the storage unit 45.

FIG. 18 is a schematic diagram of the second session correspondence information $F_2$.

As shown in FIG. 18, the second session correspondence information $F_2$ is information that associates sessions 29a of investigation packets 29 in the emulation environment 22 with the virtual spine switches 28 that are the destinations of allocation performed by the virtual leaf switches 24.

As in a session 9a (see FIG. 17), in the session 29a, information about the sender is written before the symbol "→", and information about the destination and the protocol are written after the symbol.

The second generation unit 51 also continues to scud investigation packets 29 to the virtual leaf switches 24 until investigation packets 29 are allocated to all the allocation destinations of one virtual leaf switch 24. In this example, the allocation destination of the virtual leaf switch 24 is the two virtual spine switches 28 of "Spine 1" and "Spine 2". Therefore, the second generation unit 51 continues to send investigation packets 29 to the virtual leaf switches 24 until investigation packets 29 are allocated to these two virtual spine switches 28.

Referring back to FIG. 10, explanation is continued.

The third generation unit 52 is a processing unit that generates switch correspondence information $G_s$ (See FIG. 9), using the first session correspondence information $F_1$ and the second session correspondence information $F_2$.

Figure 19:
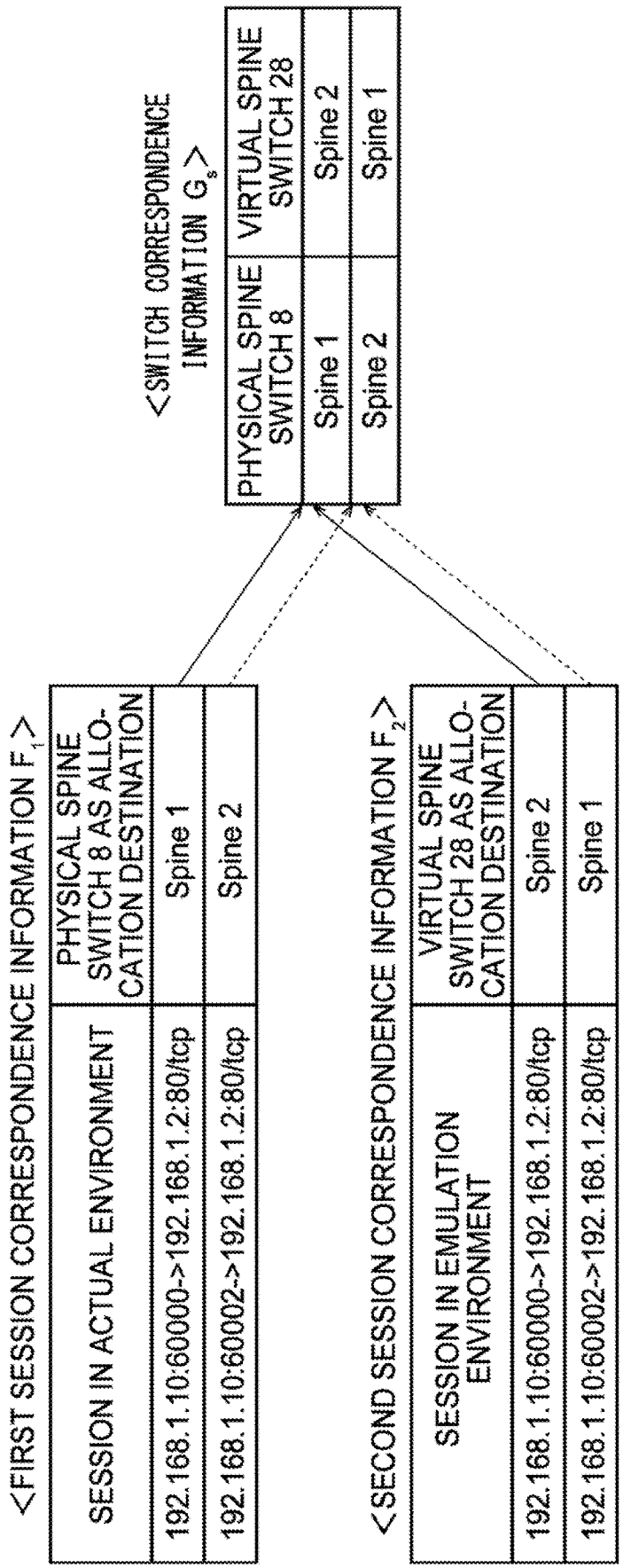
FIG. 19 is a schematic diagram illustrating a method by which a third generation unit according to this embodiment generates switch correspondence information.

FIG. 19 is a schematic diagram illustrating a method by which the third generation unit 52 generates the switch correspondence information $G_s$.

As shown in FIG. 19, the third generation unit 52 associates the physical spine switch 8 with a virtual spine switch 28, the physical spine switch 8 and the virtual spine switch 28 corresponding to the same session in the first session correspondence information $F_1$ and the second session correspondence information $F_2$.

For example, a session "192.168.1.10: 60000→192.168.1.2:80/tcp" is now described.

As shown in the first session correspondence information $F_1$, this session corresponds to the physical spine switch 8 of "Spine 1". As shown in the second session correspondence information $F_2$, the session also corresponds to the virtual spine switch 28 of "Spine 2". Accordingly, the third generation unit 52 associates the physical spine switch 8 of "Spine 1" with the virtual spine switch 28 of "Spine 2", and stores the correspondence information into the switch correspondence information $G_s$.

Referring back to FIG. 10, explanation is continued.

The packet generation unit 53 is a processing unit that generates the investigation packet 29 including the session 29a (see FIG. 18) indicated by session information when the reception unit 46 receives the session information. The session information is information indicating the session 9a of the investigation target VXLAN packet 9 as described above.

The first identification unit 54 is a processing unit that sends the investigation packet 29 generated by the packet generation unit 53 to the virtual leaf switch 24, to identify the virtual spine switch 28 that is the allocation destination of the investigation packet 29.

The second identification unit 55 refers to the switch correspondence information $G_s$ (FIG. 9) to identify the physical spine switch 8 that is the allocation destination, when the VXLAN packet 9 emulated by the investigation packet 29 is sent to the physical leaf switch 4.

For example, the second identification unit 55 refers to the switch correspondence information $G_s$ (FIG. 9), to identify the physical spine switch 8 corresponding to the virtual spine switch 28 that is the allocation destination of the investigation packet 29. The physical spine switch 8 is the physical spine switch 8 that is the allocation destination when the VXLAN packet 9 is sent to the physical leaf switch 4.

The display processing unit 56 is a processing unit that performs a process of causing the display unit 42 to display the transfer path of the VXLAN packet 9, including the physical spine switch 8 identified by the second identification unit 55.

Next, the functional configuration of the emulation apparatus 80 is described.

Figure 20:
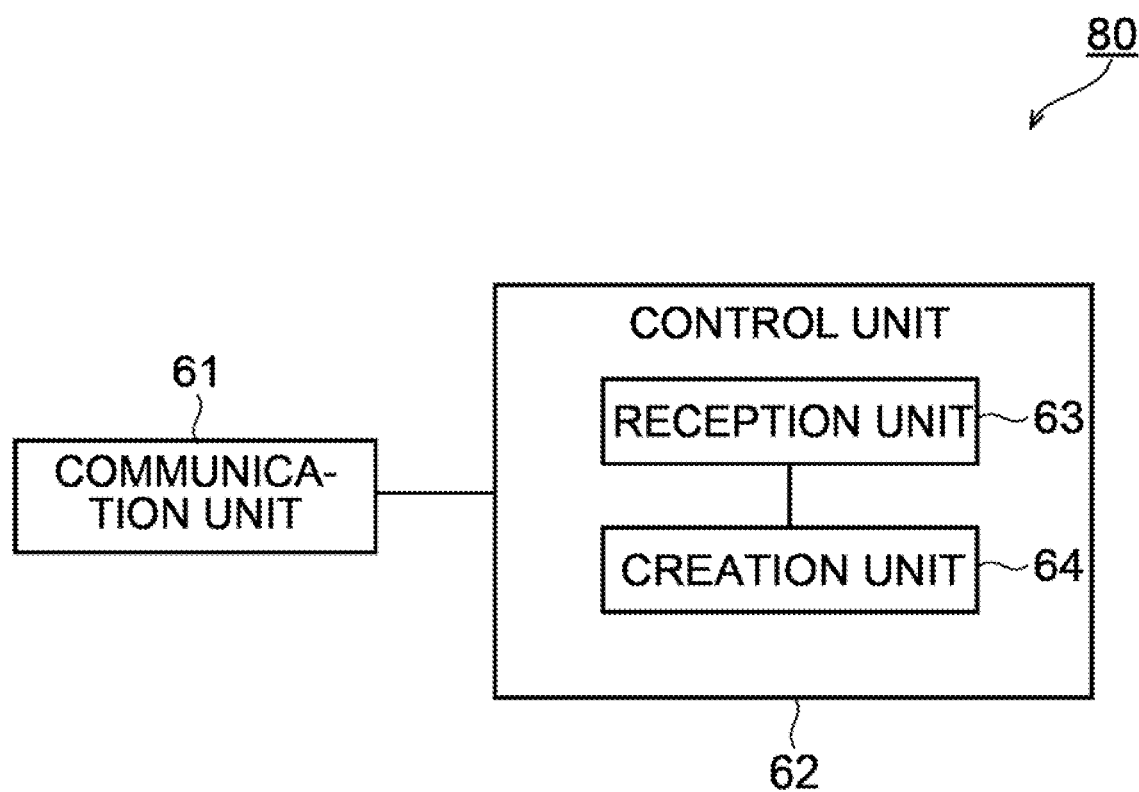
FIG. 20 is a functional configuration diagram of an emulation apparatus according to this embodiment.

FIG. 20 is a functional configuration diagram of the emulation apparatus 80.

As shown in FIG. 20, the emulation apparatus 80 includes a communication unit 61 and a control unit 62.

Of these components, the communication unit 61 is a communication interface that performs communication with the management network 90 (see FIG. 5).

The control unit 62 is a processing unit that controls the respective components of the emulation apparatus 80, and includes a reception unit 63 and a creation unit 64.

The reception unit 63 is a processing unit that receives a creation request for the virtual network 27 via the communication unit 61, when the creation processing unit 57 of the switch identification apparatus 40 issues the creation request.

The creation unit 64 is a processing unit that creates the virtual network 27 when the reception unit 63 receives the creation request. For example, on the basis of the network topology information $H_{top}$ (FIG. 12), the creation unit 64 identifies all the virtual spine switches 28 connected to the virtual leaf switch 24, and connects the virtual leaf switch 24 to the virtual spine switches 28.

The creation unit 64 further sets the IP address of the NW I/F of each network device in the emulation environment 22, on the basis of the network interface information $G_{if}$ (see FIG. 14). The creation unit 64 then refers to the routing table information $G_{route}$ (FIG. 15) and the MAC table information $G_{mac}$ (FIG. 16), to create a routing table and a MAC table of each network device in the emulation environment 22.

Although the emulation apparatus 80 is formed with a physical server separate from the switch identification apparatus 40 in this example, the switch identification apparatus 40 and the emulation apparatus 80 may be formed with one physical server. In this case, the switch identification apparatus 40 has the functions of the creation unit 64 that creates the virtual network 27.

Next, a method by which the switch identification apparatus 40 generates the switch correspondence information $G_s$ is described.

Figure 21:
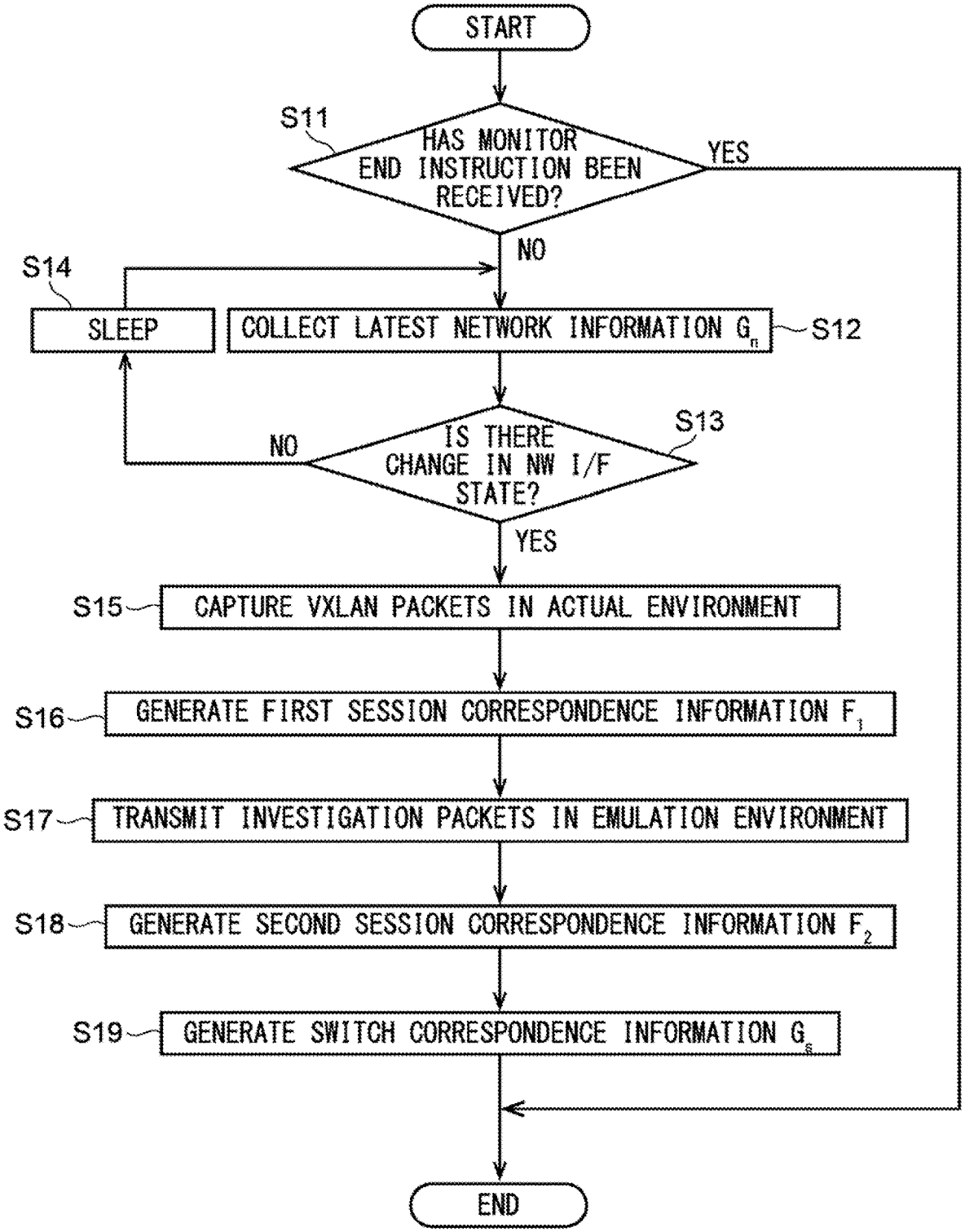
FIG. 21 is a flowchart of a method for generating switch correspondence information according to this embodiment.

FIG. 21 is a flowchart of a method for generating the switch correspondence information $G_s$.

The switch correspondence information $G_s$ is generated for each physical leaf switch 4. Therefore, the flowchart described below is also executed for each physical leaf switch 4.

First, the determination unit 47 determines whether the reception unit 46 has received a monitor end instruction to end the monitoring of the network 1 (step S11). If the reception unit 46 has received a monitor end instruction (step S11: positive), the process comes to an end.

If the reception unit 46 has not received a monitor end instruction (step S11: negative), on the other hand, the process moves on to step S12. In step S12, the collection unit 48 collects the latest network information $G_n$ from each of the physical leaf switches 4 and the physical spine switches 8, and stores the latest network information $G_n$ into the storage unit 45.

The detection unit 49 then refers to the Syslog information $H_{log}$ (FIG. 11) included in the network information $G_n$, to detect whether there is a change in the network interfaces of the physical leaf switches 4 (step S13).

If the detection unit 49 determines that there are no changes (step S13: negative), the process moves on to step S14, and the apparatus sleeps for a certain time. After that, step S12 is again carried out.

If the detection unit 49 determines that there is a change in the network interfaces (step S13: positive), on the other hand, the process moves on to step S15. In step S15, the first generation unit 50 captures the VXLAN packets 9 flowing in the respective physical leaf switches 4 in the actual environment 21. The contents to be captured are the sessions 9a of the VXLAN packets 9, and the physical spine switches 8 that are the allocation destinations of the VXLAN packets 9.

The first generation unit 50 also continues to capture the VXLAN packets 9 until the VXLAN packets 9 flow to all the allocation destinations of one physical leaf switch 4.

The first generation unit 50 next associates the captured sessions 9a with the physical spine switches 8 as the allocation destinations, to generate the first session correspondence information $F_1$ (see FIG. 17) (step S16). The first generation unit 50 then stores the first session correspondence information $F_1$ into the storage unit 45.

The emulation apparatus 80 then generates the emulation environment 22, and the second generation unit 51 transmits investigation packets 29 to the virtual leaf switches 24 of the emulation environment 22 (step S17). For example, the emulation apparatus 80 receives a creation request from the creation processing unit 57, and creates the virtual network 27 on the basis of the network information $G_n$ collected in step S12.

Here, the sessions that have the same remainder when the hash values are divided by the number of allocation destinations of the virtual leaf switch 24 are allocated to the same virtual spine switch 28, as described above with reference to FIG. 8. In the description below, a session selected from among the sessions that have the same hash value remainder will be called a representative session. The number of remainders that are different from one another is equal to the number of allocation destinations of the virtual leaf switch 24, and accordingly, the number of representative sessions is also equal to the number of the allocation destinations.

In step S17, the second generation unit 51 generates the same number of representation session investigation packets 29 as the number of the allocation destination of the virtual leaf switch 24, and transmits the investigation packets 29 to the virtual leaf switch 24. In this manner, the respective investigation packets 29 are allocated to different allocation destinations by the virtual leaf switch 24. As a result, the second generation unit 51 can more efficiently generate the investigation packets 29 having different allocation destinations than in a case where the investigation packets 29 are generated at random.

The second generation unit 51 then identifies the allocation destinations to which the virtual leaf switch 24 has allocated the investigation packets 29, and associates the allocation destinations with the sessions 29a, to generate the second session correspondence information $F_2$ (see FIG. 18) (step S18). After that, the second generation unit 51 stores the second session correspondence information $F_2$ into the storage unit 45.

The third generation unit 52 next generates the switch correspondence information $G_s$ (see FIG. 9) using the first session correspondence information $F_1$ and the second session correspondence information $F_2$, and stores the switch correspondence information $G_s$ into the storage unit 45 (step S19).

In the above manner, the basic steps in the method for generating the switch correspondence information $G_s$ are completed.

By this method, the respective generation units 50 and 51 generate the session correspondence information $F_1$ and $F_2$, in a case where a change in the network interfaces of the physical leaf switches 4 is detected in step S13. Accordingly, in step S19, the third generation unit 52 can generate the switch correspondence information $G_s$ reflecting the latest state of the network 1, on the basis of the session correspondence information $F_1$ and $F_2$.

Next, a switch identification method according to this embodiment is described.

Figure 22:
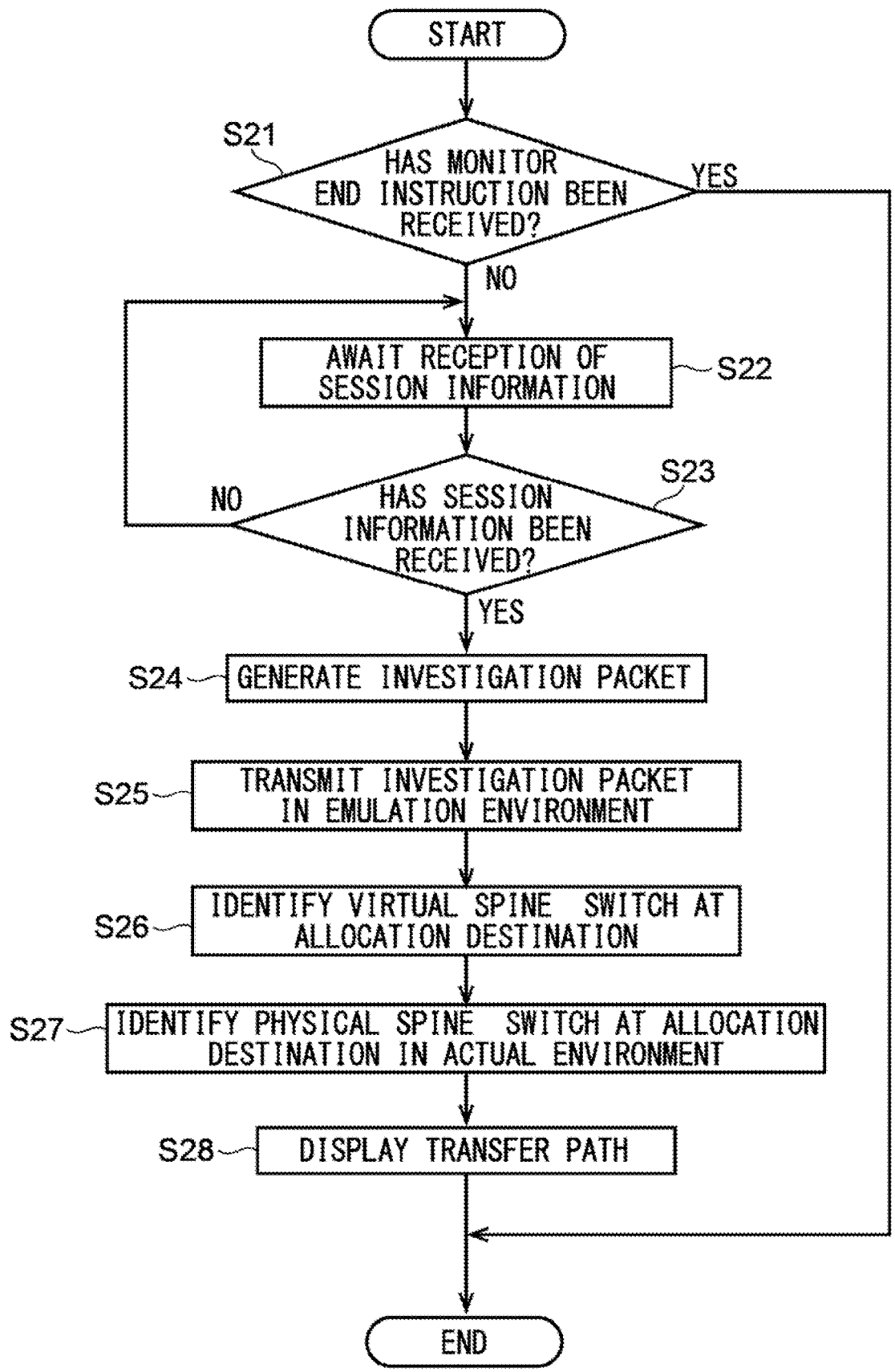
FIG. 22 is a flowchart of a switch identification method according to this embodiment.

FIG. 22 is a flowchart of the switch identification method according to this embodiment.

First, the determination unit 47 determines whether the reception unit 46 has received a monitor end instruction to end the monitoring of the network 1 (step S21). If the reception unit 46 has received a monitor end instruction (step S21 positive), the process comes to an end.

The reception unit 46 then awaits reception of session information for identifying the session 9a of the investigation target VXLAN packet 9 (step S22).

FIG. 23 is a schematic diagram of the session information. As shown in FIG. 23, the session information includes 5-tuple information for identifying the session 9a. The 5-tuple it is the sender IP address, the sender port number, the destination IP address, the destination port number, and the protocol. The session information further includes the session number for uniquely identifying the session 9a.

Referring back to FIG. 22, explanation is continued.

The determination unit 47 then determines whether the reception unit 46 has received the session information (step S23). If the reception unit 46 has not received the session information (step S23: negative), the process returns to step S22.

If the reception unit 46 has received the session information (step S23: positive), on the other hand, the process moves on to step S24. In step S24, the packet generation unit 53 generates the investigation packet 29 having the session 29a (see FIG. 18) indicated by the session information.

The first identification unit 54 then transmits the investigation packet 29 to the virtual leaf switch 24 in the emulation environment 22 (step S25). At this stage, step S17 described above (see FIG. 21) has already been carried out, and the emulation environment 22 reflecting the latest network information $G_n$ has been constructed.

The first identification unit 54 then identifies the virtual spine switch 28 that is the allocation destination of the investigation packet 29 (step S26).

The second identification unit 55 next identifies the physical spine switch 8 that is the allocation destination when the VXLAN packet 9 emulated by the investigation packet 29 is sent to the physical leaf switch 4 (step S27). For example, the second identification unit 55 refers to the switch correspondence information $G_s$ (see FIG. 9), to identify the physical spine switch 8 corresponding to the virtual spine switch 28 identified in step S26.

The second identification unit 55 further generates identification result information including the identified physical spine switch 8.

FIG. 24 is a schematic diagram of the identification result information.

As shown in FIG. 24, the identification result information is information that associates the session number included in the session information with the physical spine switch 8 that is the allocation destination of the VXLAN packet 9 having the session number. In this example, the physical spine switch 8 of "Spine 2" is identified as the allocation destination of the VXLAN packet 9.

Referring back to FIG. 22, explanation is continued.

The display processing unit 56 then performs a process of causing the display unit 42 to display the transfer path of the VXLAN packet 9, using the identification result information (see FIG. 24).

In the above manner, the basic steps in the switch identification method according to this embodiment are completed.

Figure 25:
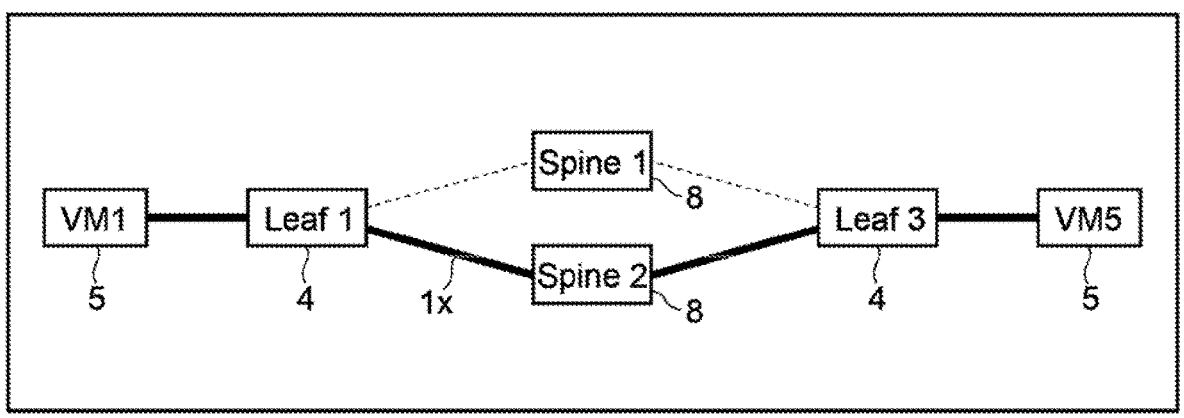
FIG. 25 is a diagram illustrating an example display on a display unit in this embodiment.

FIG. 25 is a diagram illustrating an example of display on the display unit 42 in step S28 described above.

In this example case, the path from the virtual machine 5 of "VM1" to the virtual machine 5 of "VM5" in the network 1 has been investigated. Also, as shown in FIG. 24, the allocation destination of the VXLAN packet 9 is the physical spine switch 8 of "Spine 2". In this case, the display processing unit 56 issues an instruction to the display unit 42 so that a transfer path 1x extending, through the physical spine switch 8 of "Spine 2" is displayed in an emphasized manner. With this arrangement, when a report of poor quality is received from the user of a cloud service, for example, the existence of a failure in the network 1 can be identified in the transfer path 1x, and the network devices existing in the transfer path 1x can be checked.

As described above, according to this embodiment, the switch identification apparatus 40 identifies the virtual spine switch 28 that is the allocation destination to which the investigation packet 29 in the emulation environment 22 is allocated by the virtual leaf switch 24. The switch identification apparatus 40 then refers to the switch correspondence information $G_s$ (see FIG. 9), to identify the physical spine switch 8 corresponding to the virtual spine switch 28 in the actual environment. The physical spine switch 8 is a switch through which the VXLAN packet 9 emulated by the investigation packet 29 is to pass. In this manner, the transfer path of the VXLAN packet 9 is made clear, and thus, the site of a failure in the transfer path can be identified, for example.

(Hardware Configuration)

Next, the hardware configuration of the switch identification apparatus 40 according to this embodiment is described.

Figure 26:
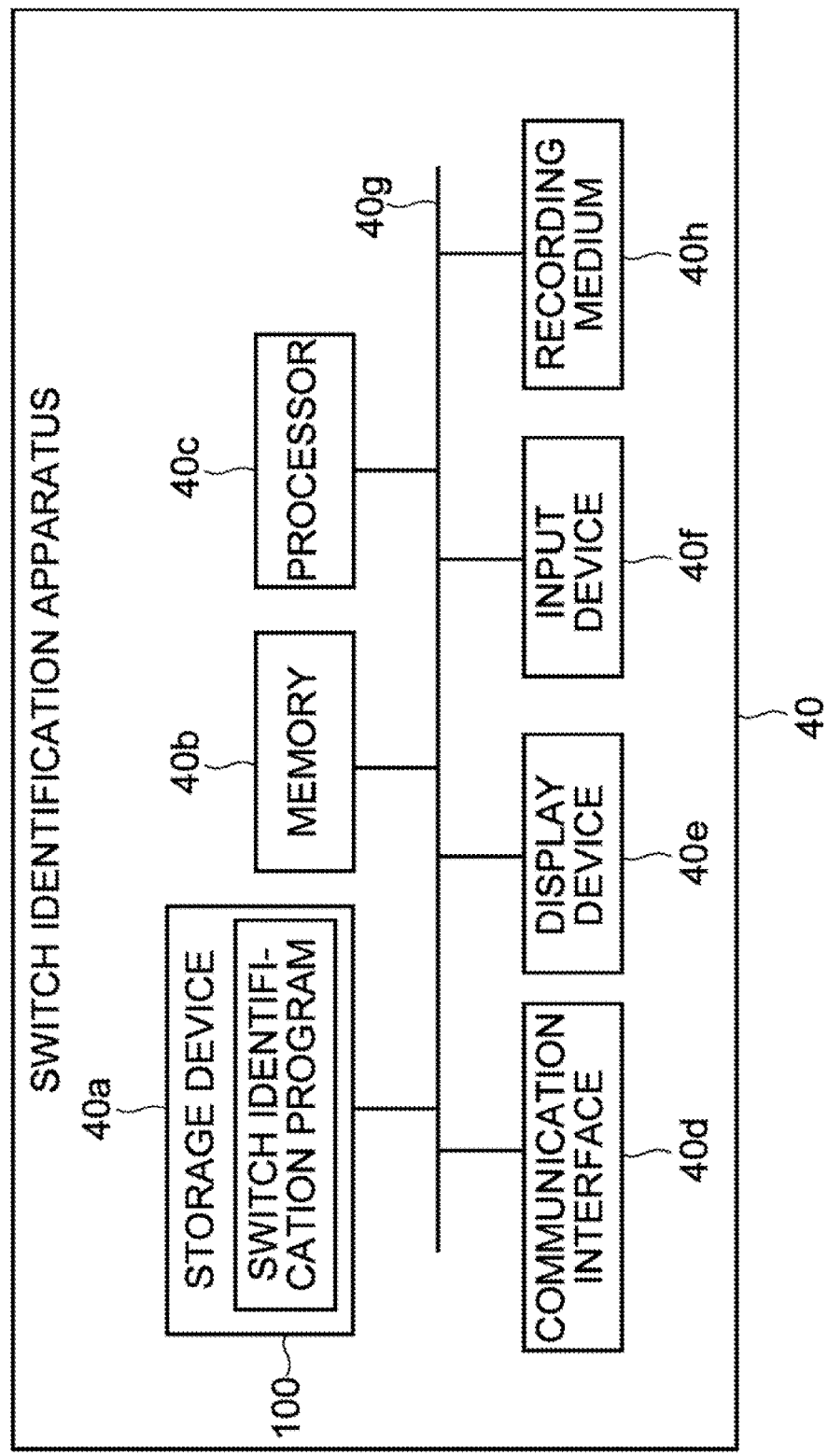
FIG. 26 is a hardware configuration diagram of a switch identification apparatus according to this embodiment.

FIG. 26 is a hardware configuration diagram of the switch identification apparatus 40 according to this embodiment.

As shown in FIG. 26, the switch identification apparatus 40 includes a storage device 40a, a memory 40b, a processor 40c, a communication interface 40d, a display device 40e, and an input device 40f. These components are connected to one another by a bus 40g.

Of these components, the storage device 40a is a nonvolatile storage such as a hard disk drive (HDD) or a solid state drive (SSD), and stores a switch identification program 100 according to this embodiment.

Alternatively, the switch identification program 100 may be recorded in a computer-readable recording medium 40h, and the processor 40e may be made to read the switch identification program 100 from the recording medium 40h.

Such a recording medium 40b may be a physically portable recording medium such as a CD-ROM (Compact Disc-Read Only Memory), a DVD (Digital Versatile Disc), or a USB (Universal Serial Bus) memory, for example. Also, a semiconductor memory such as a flash memory, or a hard disk drive may be used as the recording medium 40h. Such a recording medium 40h is not a temporary medium such as carrier waves not having a physical form.

Further, the switch identification program 100 may be stored in a device connected to a public line, the Internet, a local area network (LAN), or the like. In that case, the processor 40c should read and execute the switch identification program 100.

Meanwhile, the memory 40b is hardware that temporarily stores data like a dynamic random access memory (DRAM) or the like, and the switch identification program 100 is loaded into the memory 40b.

The processor 40c is hardware such as a central processing unit (CPU) or a graphical processing unit (GPU) that controls the respective components of the switch identification apparatus 40. The processor 40c also executes the switch identification program 100 in cooperation with the memory 40b.

As the memory 40b and the processor 40c cooperate to execute the switch identification program 100, the control unit 44 shown in FIG. 10 is formed. The control unit 44 includes the reception unit 45 the determination unit 4 the collection unit 48, the detection unit 49, the first to third generation units 50 to 52, the packet generation unit 53, the first identification unit 54, the second identification unit 55, the display processing unit 56, and the creation processing unit 57.

The storage unit 45 shown in FIG. 10 is formed with the storage device 40a and the memory 40b.

Further, the communication interface 40d is a communication interface such as a network interface card (NIC) fin connecting the switch identification apparatus 40 to the management network 90 (see FIG. 5). The communication unit 43 shown in FIG. 10 is formed with the communication interface 40d.

The display device 40e is hardware such as a liquid crystal display device for forming the display unit 42 (see FIG. 10). The input device 40f is hardware such as a keyboard or a mouse for forming the input unit 41 (see FIG. 10). For example, the manager operates the input device 40f, to issue various instructions to the switch identification apparatus 40.

Next, the hardware configuration of the emulation apparatus 80 is described.

Figure 27:
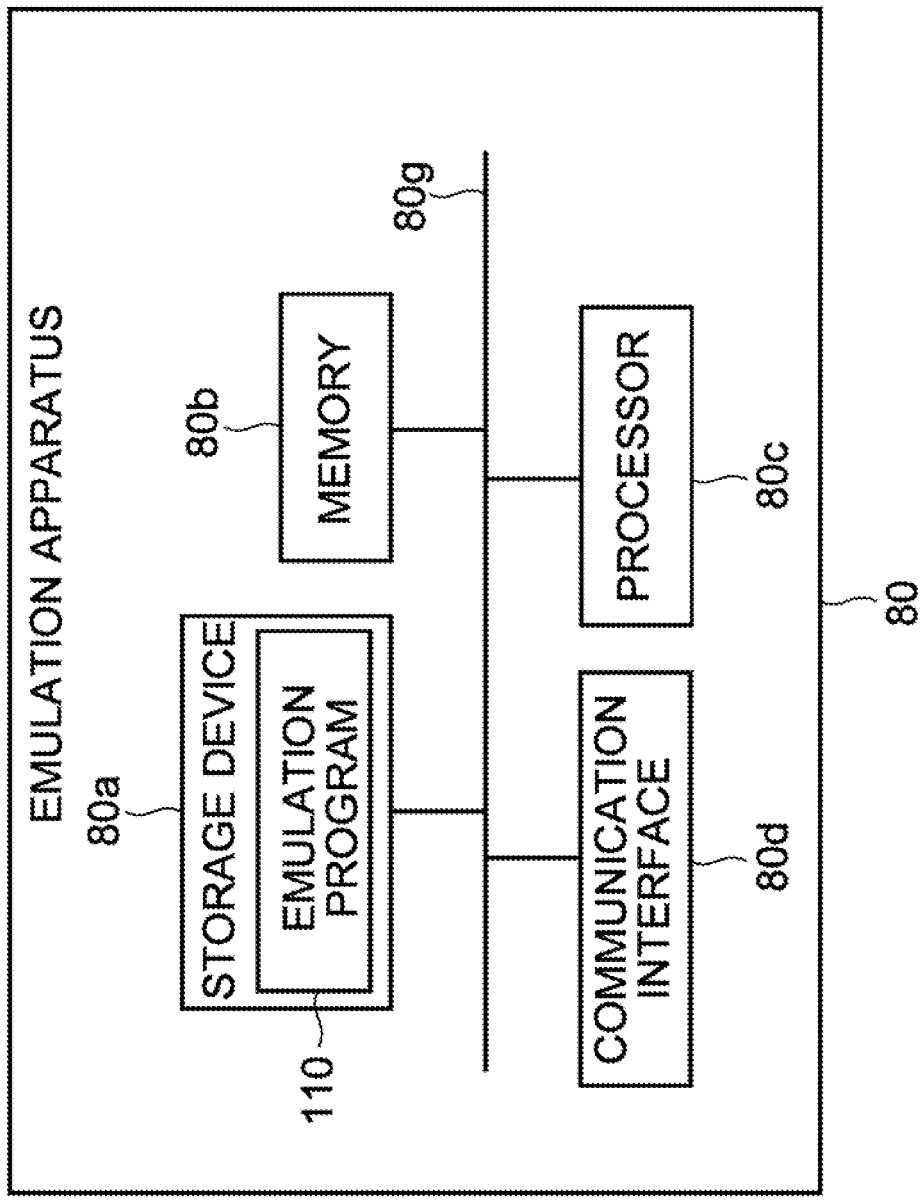
FIG. 27 is a hardware configuration diagram of an emulation apparatus according to this embodiment.

FIG. 27 is a hardware configuration diagram of the emulation apparatus 80 according to this embodiment.

As shown in FIG. 27, the emulation apparatus 80 includes a storage device 80a, a memory 80b, a processor 80c, and a communication interface 80d. These components are connected to one another by a bus 80g.

The storage device 80a is a nonvolatile storage such as an HDD or an SSD, and stores an emulation program 110 according to this embodiment.

The memory 80b is hardware that temporarily, stores data like a DRAM or the like, and the emulation program 110 is loaded into the memory 80b.

The processor 80c is hardware such as a CPU or a GPU that controls the respective components of the emulation apparatus 80. The processor 80c also executes the emulation program 110 in cooperation with the memory 80b.

As the memory 80b and the processor 80c cooperate to execute the emulation program 110, the control unit 62 (see FIG. 20) including the reception unit 63 and the creation unit 64 is formed.

Further, the communication interface 80d is a communication interface such as a NIC for connecting the emulation apparatus 80 to the management network 90 (see FIG. 5).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A switch identification method implemented by a computer, the switch identification method comprising:
sending a first packet to a first virtual switch emulating a first physical switch, and identifying a second virtual switch that is an allocation destination to which the first virtual switch allocates the first packet; and
referring to a storage unit that stores a switch correspondence information that associates a second physical switch that is an allocation destination of the first physical switch with the second virtual switch, and identifying the second physical switch that is the allocation destination to which the first physical switch allocates a second packet emulated by the first packet,
acquiring sessions and allocation destinations of a plurality of second packets flowing in the first physical switch, and generating a first session correspondence information that associates the sessions of the respective second packets with the second physical switch that is the allocation destination, sending a plurality of first packets to the first virtual switch, and generating a second session correspondence information that associates sessions of the respective first packets with the second virtual switch that is the allocation destination, and
generating the switch correspondence information by associating the second physical switch with the second virtual switch corresponding to the same session in the first session correspondence information and the second session correspondence information,
wherein the first virtual switch allocates the first packet to the second virtual switch, in accordance with a hash table associating a hash value determined by the session of the first packet with the allocation destination of the first virtual switch, and
the sending the first packet includes generating a plurality of the first packets, where a value obtained by dividing the hash value by the number of the allocation destinations of the first virtual switch is different for each of the first packet.

2. The switch identification method according to claim 1, further comprising: determining whether there is a change in a network interface of the first physical switch, and when the change is detected, generating the first session correspondence information and the second session correspondence information.

3. The switch identification method according to claim 1, wherein the first physical switch is a leaf switch, and the second physical switch is a spine switch.

4. The switch identification method according to claim 1, further comprising:
collecting a network information about a network including the first physical switch and the second physical switch, and
in accordance with the network information, performing a process of creating a virtual network that has the same configuration as the network, and includes the first virtual switch and the second virtual switch.

5. The switch identification method according to claim 1, further comprising:
receiving an input of a session information indicating a session of the second packet, and
generating the first packet having the same session as the session of the second packet.

6. The switch identification method according to claim 1, wherein each of the first physical switch and the first virtual switch determines an allocation destination in accordance with ECMP (Equal Cost Multi Path).

7. A non-transitory computer-readable recording medium storing a switch identification program causing a computer to execute a process, the process comprising:
sending a first packet to a first virtual switch emulating a first physical switch, and identifying a second virtual switch that is an allocation destination to which the first virtual switch allocates the first packet; and
referring to a storage unit that stores a switch correspondence information that associates a second physical switch that is an allocation destination of the first physical switch with the second virtual switch, and identifying the second physical switch that is the allocation destination to which the first physical switch allocates a second packet emulated by the first packet,
acquiring sessions and allocation destinations of a plurality of second packets flowing in the first physical switch, and generating a first session correspondence information that associates the sessions of the respective second packets with the second physical switch that is the allocation destination,
sending a plurality of first packets to the first virtual switch, and generating a second session correspondence information that associates sessions of the respective first packets with the second virtual switch that is the allocation destination, and
generating the switch correspondence information by associating the second physical switch with the second virtual switch corresponding to the same session in the first session correspondence information and the second session correspondence information,
wherein the first virtual switch allocates the first packet to the second virtual switch, in accordance with a hash table associating a hash value determined by the session of the first packet with the allocation destination of the first virtual switch, and
the sending the first packet includes generating a plurality of the first packets, where a value obtained by dividing the hash value by the number of the allocation destinations of the first virtual switch is different for each of the first packet.

* * * * *